US008203429B2

(12) United States Patent
Borcherding

(10) Patent No.: US 8,203,429 B2
(45) Date of Patent: Jun. 19, 2012

(54) SWITCHED CAPACITANCE METHOD FOR THE DETECTION OF, AND SUBSEQUENT COMMUNICATION WITH A WIRELESS TRANSPONDER DEVICE USING A SINGLE ANTENNA

(75) Inventor: Eric J. Borcherding, Westminster, CO (US)

(73) Assignee: Assa Abloy AB (SE)

( * ) Notice: Subject to any disclaimer, the term of this patent is extended or adjusted under 35 U.S.C. 154(b) by 542 days.

(21) Appl. No.: 12/416,104

(22) Filed: Mar. 31, 2009

(65) Prior Publication Data

US 2009/0251291 A1 Oct. 8, 2009

Related U.S. Application Data

(60) Provisional application No. 61/041,358, filed on Apr. 1, 2008.

(51) Int. Cl.
*H04Q 5/22* (2006.01)
(52) U.S. Cl. ............. 340/10.1; 340/572.4; 340/572.7; 340/572.5; 340/10.3
(58) Field of Classification Search ............. 340/10.1, 340/572.4, 572.7, 572.5, 10.3; 235/439
See application file for complete search history.

(56) References Cited

U.S. PATENT DOCUMENTS

| | | | |
|---|---|---|---|
| 3,859,624 A | 1/1975 | Kriofsky | |
| 4,471,343 A | 9/1984 | Lemelson | |
| 4,525,686 A | 6/1985 | Yokoya | |
| 4,730,188 A | 3/1988 | Milheiser | |
| 4,752,776 A | 6/1988 | Katzenstein | |
| 5,347,263 A | 9/1994 | Carroll et al. | |
| 5,523,746 A | 6/1996 | Gallagher | |
| 5,541,574 A | 7/1996 | Lowe et al. | |
| 5,973,611 A | 10/1999 | Kulha et al. | |
| 6,097,301 A | 8/2000 | Tuttle | |
| 6,340,932 B1* | 1/2002 | Rodgers et al. | 340/572.7 |
| 6,476,708 B1* | 11/2002 | Johnson | 340/10.34 |
| 6,617,962 B1 | 9/2003 | Horwitz et al. | |
| 6,650,227 B1* | 11/2003 | Bradin | 340/10.3 |
| 6,905,074 B2 | 6/2005 | Charrat | |
| 7,046,121 B2* | 5/2006 | Wuidart | 340/10.1 |
| 7,180,403 B2* | 2/2007 | Quan | 340/10.3 |
| 7,245,222 B2* | 7/2007 | Bierach | 340/572.4 |
| 7,439,860 B2* | 10/2008 | Andresky | 340/572.1 |
| 7,439,862 B2* | 10/2008 | Quan | 340/572.7 |
| 7,539,465 B2* | 5/2009 | Quan | 455/121 |
| 7,782,209 B2* | 8/2010 | Lowe et al. | 340/572.4 |
| 2002/0061738 A1 | 5/2002 | Simmons et al. | |
| 2003/0169169 A1* | 9/2003 | Wuidart et al. | 340/572.7 |

(Continued)

FOREIGN PATENT DOCUMENTS

EP 0783158 7/1997

(Continued)

OTHER PUBLICATIONS

Search Opinion for European Patent Application No. EP 09156982, dated May 9, 2011 6 pages.

(Continued)

*Primary Examiner* — Hoi Lau
(74) *Attorney, Agent, or Firm* — Sheridan Ross P.C.

(57) ABSTRACT

A transponder detector is provided with capabilities for detecting the presence and type of a transponder in its read range while operating at low power and also using a common antenna for detecting and executing data transactions with transponders.

22 Claims, 8 Drawing Sheets

U.S. PATENT DOCUMENTS

| | | | |
|---|---|---|---|
| 2005/0024198 A1* | 2/2005 | Ward | 340/505 |
| 2005/0083180 A1 | 4/2005 | Horwitz et al. | |
| 2005/0125093 A1* | 6/2005 | Kikuchi et al. | 700/213 |
| 2005/0225437 A1 | 10/2005 | Shiotsu et al. | |
| 2005/0258940 A1* | 11/2005 | Quan | 340/10.3 |
| 2005/0258966 A1* | 11/2005 | Quan | 340/572.7 |
| 2006/0238301 A1* | 10/2006 | Wu et al. | 340/10.1 |
| 2007/0222605 A1* | 9/2007 | Andresky | 340/572.7 |
| 2007/0229273 A1* | 10/2007 | Hoemann et al. | 340/572.4 |
| 2007/0236336 A1* | 10/2007 | Borcherding | 340/10.34 |
| 2008/0088415 A1* | 4/2008 | Quan | 340/10.3 |
| 2009/0251291 A1* | 10/2009 | Borcherding | 340/10.1 |
| 2010/0259390 A1 | 10/2010 | Borcherding | |

FOREIGN PATENT DOCUMENTS

| | | |
|---|---|---|
| EP | 0899677 | 3/1999 |
| EP | 1160583 | 12/2001 |
| EP | 1394720 | 3/2004 |
| EP | 1605391 | 12/2005 |
| EP | 1837800 | 9/2007 |
| EP | 1840790 | 10/2007 |
| GB | 2237427 | 5/1991 |
| GB | 2278631 | 12/1993 |
| WO | WO 98/01837 | 1/1998 |
| WO | WO 00/42585 | 7/2000 |

OTHER PUBLICATIONS

Official Action for U.S. Appl. No. 12/822,397, mailed Jun. 20, 2011 11 pages.
Notice of Allowance for U.S. Appl. No. 11/396,291, mailed Jun. 30, 2011 5 pages.
Official Communication for European Patent Application No. 07251385.6, dated May 7, 2009.
Extended European Search Report issued for European Patent Application No. 07251385.6, dated Jul. 10, 2007.
Examination Report for European Application No. 07251386.4, mailed Nov. 7, 2008.
Official Communication for European Patent Application No. 07251385.6, dated Oct. 20, 2009.
Examiner's First Report for Australian Patent Application No. 2007201297, dated May 17, 2010.
Official Action for European Patent Application No. 07251385.6, dated Mar. 4, 2011 4 pages.
Notice of Acceptance for Australia Patent Application No. 2007201297, dated Mar. 31, 2011 3 pages.
Extended European Search Report for European Patent Application No. EP 09156982, dated Apr. 28, 2011 2 pages.
Office Action for U.S. Appl. No. 11/396,290, mailed Apr. 1, 2009.
Office Action for U.S. Appl. No. 11/396,290, mailed Oct. 28, 2009.
Office Action for U.S. Appl. No. 11/396,291, mailed Mar. 24, 2010.
Official Action for U.S. Appl. No. 11/396,291, mailed Aug. 25, 2010.
Official Action for U.S. Appl. No. 11/396,291, mailed Feb. 4, 2011.
European Search Report for European Application No. 07251386.4, mailed Mar. 6, 2008.
Examination Report for European Application No. 07251386.4, mailed Nov. 11, 2008.
Written Opinion for European Application No. 07251386.4, mailed Mar. 6, 2008.
Official Action for U.S. Appl. No. 12/822,397, mailed Feb. 9, 2012 20 pages.

* cited by examiner

SWITCHED CAPACITANCE METHOD FOR THE DETECTION OF, AND SUBSEQUENT COMMUNICATION WITH A WIRELESS TRANSPONDER DEVICE USING A SINGLE ANTENNA

CROSS-REFERENCE TO RELATED APPLICATIONS

This Application claims the benefit of U.S. Provisional Application No. 61/041,358, filed Apr. 1, 2008, the entire disclosure of which is hereby incorporated herein by reference.

TECHNICAL FIELD

The present invention relates generally to RFID systems and, more particularly, to the construction and operation of a transponder detector capable of detecting and reading transponders with the same antenna.

BACKGROUND OF THE INVENTION

Radio frequency identification (RFID) systems typically include at least one reader and a plurality of transponders, which are commonly termed credentials, cards, tags, or the like. Each transponder is an active or passive radio frequency communication device which is directly attached to or embedded in an article to be identified or otherwise characterized by the reader. Alternatively, the transponder is embedded in a portable substrate, such as a card, tag, or the like, carried by a person or an article to be identified or otherwise characterized by the reader.

An active transponder is powered up by its own internal power supply, such as an internal battery, which provides the operating power for the transponder circuitry. In contrast, a passive transponder is dependent on the reader for its power. The passive transponder typically consists of an integrated circuit (IC) chip coupled to a resonant LC circuit which has a capacitor and an inductive antenna in parallel or in series. The reader "excites" or powers up the passive transponder by transmitting excitation signals of a given frequency into the proximal space surrounding the reader. When the transponder resides in the proximal space, its inductive antenna receives the excitation signals which are converted into the operating power for the IC chip of the recipient transponder.

The powered up transponder generates transponder data signals which are in the form of electromagnetic waves embodying information such as identity data or other characterizing data stored in the memory of the IC chip. The transponder data signals are characterized by a specific carrier frequency which generally corresponds to the frequency of the excitation signals. The carrier frequency is inter alia a function of the transponder LC circuit and is often unique to the particular manufacturer of the transponder used to generate the transponder data signal. The transponder manufacturer establishes a desired carrier frequency of transponder data signals by tuning the LC circuit to a resonant frequency which corresponds to the desired carrier frequency.

The resonant frequency (and correspondingly the carrier frequency) of commercially-available passive transponders conventionally employed in RFID applications generally fall within either a low frequency range or a high frequency range. The low frequency range extends about a nominal low frequency of 125 kHz and is typically within a range of 100 to 150 kHz. In contrast, the high frequency range extends about a nominal high frequency of 13.56 MHz. Low frequency transponders are commonly termed proximity credentials and high frequency transponders are commonly termed smart credentials. It is apparent from the above that there can be significant variability in transponder frequencies even among different types of low frequency transponders or among different types of high frequency transponders. More specifically, a credential that is designed to operate at about 13.56 MHz may actually operate at a frequency of about 14 MHz or even 15 MHz depending upon the specifications to which the card was built.

In any case, the transponder data signals are transmitted via the transponder antenna into the proximal space surrounding the reader in which the transponder resides. The reader contains its own LC circuit having a capacitor and an inductive antenna which is tuned to essentially the same resonant frequency as the transponder LC circuit, thereby rendering the reader and transponder compatible. The reader LC circuit receives the transponder data signals and is coupled to additional reader circuitry, which enable the reader to "read" the transponder data signals (i.e., extract the data from the transponder data signals). Accordingly, contactless communication is effected between the reader and the transponder in accordance with a specific communication protocol, which is likewise often unique to the particular manufacturer of the transponder and/or reader.

The excitation signal generating and transmitting functions and the transponder data signal receiving and reading functions performed by the reader as described above define a mode of reader operation termed a "data transaction mode." The data transaction mode further encompasses reader data signal generating and transmitting functions, wherein information stored in the reader memory or otherwise generated by the reader is communicated to the transponder. The manner in which the reader communicates information to the transponder is essentially the same or similar to the manner in which the transponder communicates information to the reader. As such, the reader data signals are characterized by essentially the same carrier frequency as the transponder data signals.

SUMMARY OF THE INVENTION

Although a reader can continuously operate in the data transaction mode, the functions of the data transaction mode typically have a relatively high power demand, which can rapidly deplete the power supply of the reader. This condition is particularly undesirable when the reader is powered by a self-contained portable power supply, such as a small disposable or rechargeable battery, which has a finite life. It is generally more power efficient to operate the reader in the data transaction mode only when a transponder is within the read range of the reader and to operate the reader in an alternate mode having a relatively lower power demand at all other times. A preferred alternate lower power mode of operation is termed a detection mode, which is commonly enabled by a ping or impulse signal generator circuit and a transponder detection circuit provided within the reader. Traditional readers operate in the detection mode except when the transponder detection circuit detects a transponder within the read range of the reader. The reader then switches to the data transaction mode upon detection of a transponder, but only for a limited time sufficient to complete communication between the reader and transponder before switching back to the detection mode.

U.S. Pat. No. 6,476,708 to Johnson (the '708 patent), which is incorporated herein by reference, discloses an exemplary reader having a low power detection mode and a high power data transaction mode of operation. The reader includes a signal generator circuit, having solid-state electronics, which alternately acts as the ping or impulse signal generator circuit or an excitation signal generator circuit depending on the operating mode of the reader at any given time. The reader further includes a small portable battery power supply and the transponder detection circuit which is coupled to the signal generator circuit.

The operating principle of the detection mode is to detect a transponder within the read range of the reader by measuring changes in a response on the reader antenna. The detection mode is initiated by generating a detection pulse using the signal generator circuit and applying the detection impulse to the reader antenna. The detection impulse causes the reader antenna to transmit a ping or impulse signal into the surrounding space, which has a frequency corresponding to the resonant frequency of the tuned LC circuit of the reader. The resulting ping or impulse signal causes a predictable response or ring signal to be received on the reader antenna. Although the ping or impulse signal has insufficient power to operate any transponders residing in the surrounding space, if a transponder having a resonant frequency at or near the resonant frequency of the reader is sufficiently proximal to the reader, the response or ring or impulse on the reader antenna is altered in a characteristic manner. In particular, inductive coupling of the reader antenna to the nearby transponder antenna causes a change in the response on the reader antenna.

The reader employs the transponder detection circuit to detect this change in the response. In particular, the transponder detection circuit monitors the level of a designated transponder detection parameter of the response. When the transponder detection parameter reaches a predetermined threshold level, the presence of a transponder in the surrounding space is confirmed and the transponder detection circuit switches the signal generator circuit from the low power detection mode to the high power data transaction mode thereby terminating generation of the ping or impulse signals. As such, the signal generator circuit transitions to an excitation signal generator circuit, wherein the signal generator circuit draws increased electrical current from the reader power supply to generate and transmit an excitation signal which is sufficient to activate the transponder. The excitation signal is received by the transponder and powers the transponder circuitry, which in turn generates a transponder data signal for transmission to the reader. After the reader reads the received transponder data signal, the signal generator circuit switches back to the detection mode and resumes generation of the ping or impulse signals while terminating generation of the excitation signals.

Since only ping or impulse signals are transmitted by the reader during the detection mode, the reader runs at a very low duty cycle and a variable repetition rate for the duration of the detection mode. Consequently, the above-described technique enables the reader to operate with a relatively low average power consumption to avoid accelerated dissipation of the reader power supply while maintaining a rapid response time for transponder detection.

One problem with traditional readers is that the detection of a transponder, or any form factor carrying a transponder such as an access credential or card, requires a tuning network for an inductively coupled antenna that allows the transponder circuit to resonate at a predictable frequency with a predictable delay. Communication with a transponder requires impedance matching between the antenna and the antenna driver circuit to maximize RF power delivered to the transponder. These two requirements force different reader component values for tuning that make transponder detection and communication on a single antenna very difficult.

Embodiments of the present invention solve this particular problem of tuning on a single antenna by splitting the tuning capacitance and switching one of the capacitors to create an impulse during the detection mode. The impedance network for the antenna consists of one or more capacitors in series with the inductor and one or capacitors in parallel with the reader antenna. In accordance with at least some embodiments of the present invention, the parallel capacitors may be split during the detection mode such that one of the capacitors can be selectively shifted or disconnected from ground. The split may be affected by a low impedance driver, for example. When it is desired to have the reader go back into the transaction mode (e.g., because the presence of a transponder has been detected) the capacitor that was previously shifted or disconnected from the circuit is reconnected to a near or simulated ground through the low impedance driver. It is thus one aspect of the present invention to provide an inductively coupled antenna and a shared antenna driver.

In accordance with at least some embodiments of the present invention, a reader is provided that can utilize a single RFID antenna to carry data to/from the reader from/to a credential in a transaction mode, as well as detect credentials in a detection mode. The detection mode may be operated according to a low power consumption method while sharing the same antenna. Readers utilizing embodiments of the present invention may be capable of consuming about 68 mA hours over the course of a year of operation. Accordingly, the reader detection function alone may be operated for over 30 years on an amount of energy typically stored in 4 AA batteries. Even if the reader is operating with an external power source, such as from a power outlet, the effective power consumption can be reduced.

The detection or "ping" capacitance and antenna inductance/size may be adjusted so that the antenna impedance effectively matches the antenna driver. It can also be used, in part, to adjust the source to load coupling impedance, amplitude, tune to retain optimally low detector power use, and somewhat set the circuit Q (i.e., quality factor), as well as a shift of ping frequency upwards with respect to the transaction frequency. In other words, the frequency that the antenna is operated at during the detection mode may correspond to a higher frequency than that frequency which is used by the antenna during the transaction mode. Tuning of the circuit in this manner can also affect the detection and/or transaction range of the antenna. In other words, the range of the antenna should be larger during the transaction mode than during the detection mode. This is done by adjusting the ratio of the capacitance in the shifted ground and the capacitance on the real ground. It is one aspect of the present invention to affect a simulated ground of one of the parallel capacitors that allows the ping impulse to occur on the same antenna that is used during the transaction mode.

Additional details of the detection algorithm and associated software are described in U.S. patent application Ser. No. 11/396,291, filed on Mar. 31, 2006, the entire contents of which are incorporated herein by reference. The embedded software may be used to evaluate the voltage waveform received during the detection mode. Upon detecting a change (e.g., any sufficient and user definable delta) in this waveform due to the presence of something having an inductance in the RFID field can be interpreted as a "card hit", which will cause the reader to enter the transaction mode.

In accordance with at least some embodiments of the present invention, the antenna may be connected to the tuning and driver circuits via a 4-wire interface. This antenna can be remoted and/or be swapped for a similar antenna. Alternatively, a 2-wire interface may be used to connect the antenna to the tuning and driver circuits. In this case, the reader and antenna form a pair. It is thus one aspect of the present invention to provide a reader that can operate a 2 or 4 wire antenna for detecting and communicating with transponders around of the range of about 0 to 12 inches. Lower power consumption by the reader may be achieved by the use of specific gates in any IC transitioning together. Thus, internal instability is essentially eliminated while operating in this lower power method.

It is another aspect of the present invention to provide the reader with the ability to perform multi-frequency pinging on the same antenna. This is advantageous since transponders may operate at somewhat different frequencies or greatly varying frequencies. For example, two transponders may be rated to operate at about 13.56 MHz but each transponder may actually operate at different frequencies. If one of the transponders actually operates above 14 MHz, any ping of a lesser frequency may not be sufficient to excite the transponder to respond in a manner that is detectable by the reader. Accordingly, the reader may be adapted to operate in the detection mode at a number of different frequencies to account for the slight differences in operating frequency of a population of transponders. This frequency shift is done by additional parallel ping capacitors connected through switching IC gates or FETs.

Alternatively, two transponders may be designed to operate at significantly different carrier frequencies (i.e., 125 kHz and 13.56 MHz). In this example, the reader may be adapted to operate in the detection mode such that it can attempt to detect a transponder operating at the lower frequency and the (if no low-frequency transponder was detected) attempt to detect a transponder operating at the higher frequency. The reader may continue to toggle between the high and low frequencies until a transponder is detected at one of those frequencies, in which case the reader will then alter it's mode of operation to transact with the detected transponder at it's carrier frequency. This switching can be facilitated by multiple NFETs and capacitors across the antenna and ground.

One circuit that can be used in accordance with at least some embodiments of the present invention may include two NFETs with common drains and opposing body diodes so that the source of one NFET is grounded and the source of the other NFET connects to the capacitance that is being switched. This particular type of circuit may afford a greater isolation capability for the antenna.

It is another aspect of the present invention to provide an algorithm or method for operating a single antenna to detect transponders presented to the reader and then interact with the detected transponders. In accordance with at least one embodiment of the present invention, the method comprises starting the reader in a dormant state that is periodically interrupted by the transmission of a transponder detection impulse or ping. A ring or response signal is then received and analyzed by the reader at the same antenna that was used to produce the impulse. During the analysis step the reader determines whether the response indicates that a new object has been introduced into the field of the reader or not. If the response indicates an object has been introduced into the field, then the reader will initiate a transaction mode whereby the same antenna that sent out the detection impulse is used to send a carrier plus data signal. If the detected object corresponds to a transponder that understands this carrier and data signal transmitted by the reader, then the transponder will respond with a carrier and data signal, which is received and processed at the reader. During this transaction mode, the operation of the detection mode is delayed.

Once the transaction between the reader and transponder has completed, the reader will re-initiate the detection mode where detection impulses or pings are periodically sent into the space surrounding the reader. One interesting aspect of the present invention is that the reader can review subsequently received responses while accounting for the transponder that was previously detected. Accordingly, the reader will not necessarily try and initiate a second transaction with the previously detected transponder as long as that transponder is not placed closer to the reader. If the previously detected transponder is kept in substantially the same place or moved slightly away from the reader, the reader will determine that the detected change in the response ring is due to the presence of the previously detected transponder. Thus, the reader will continue to initiate periodic detection impulses or pings. If, however, another transponder or object is introduced to the field that further alters the response ring, then the reader will initiate the transaction mode for the newly detected transponder or object. One advantage offered by this particular method is that the reader is prevented from initiating the transaction mode, which has a relatively higher power consumption than the detection mode, while a transponder is being withdrawn from the proximity of the reader. This ultimately reduces the amount of energy consumed by the reader.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

DESCRIPTION OF PREFERRED EMBODIMENTS

The invention will be illustrated below in conjunction with an exemplary reader device. Although well suited for use with, e.g., a system using access control readers and/or transponders, the invention is not limited to use with any particular type of access control system or configuration of system elements. Those skilled in the art will recognize that the disclosed techniques may be used in any RF system n which it is desirable to minimize power consumption of the reader.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
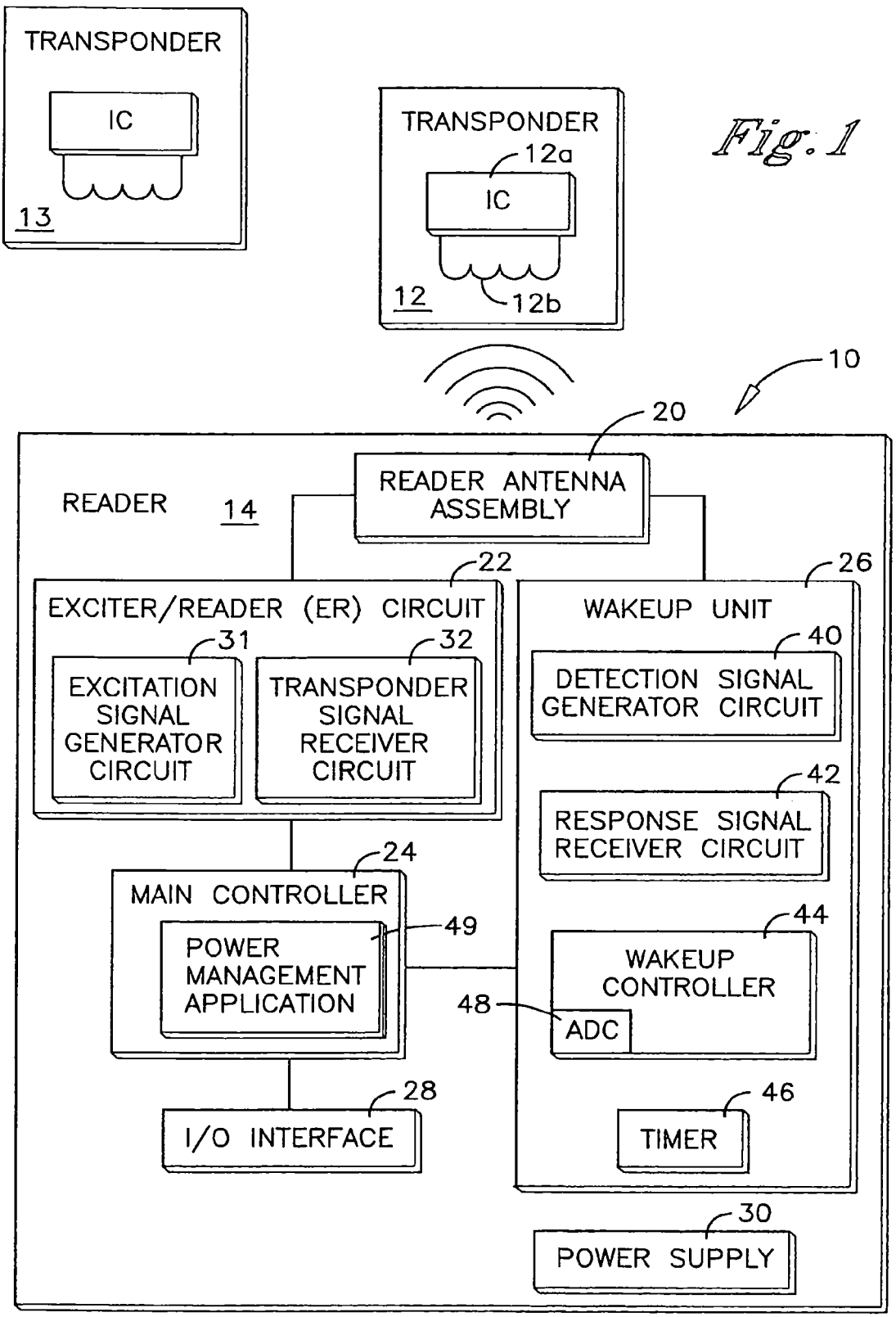
FIG. 1 is a block diagram of an RFID system including a transponder and a reader having a reader antenna assembly and wakeup unit of the present invention.

An RFID system is shown in FIG. 1 and is generally designated 10. The RFID system 10 comprises a transponder 12 and a reader 14. The reader 14 includes a transponder detector of the present invention which is described below. The transponder 12 is preferably a passive transponder which does not require an internal power supply. Instead the electrical power required to operate the transponder 12 is supplied to the transponder 12 by electromagnetic energy transmitted from the reader 14. Accordingly, the transponder 12 is operational when it receives electromagnetic waves from the reader, which are of a specific frequency and of a sufficient strength to power up the transponder.

The transponder 12 comprises a number of functional elements including a transponder integrated circuit (IC) 12a and a transponder antenna 12b. The transponder IC 12a embodies the processing and memory capabilities of the transponder 12. The transponder antenna 12b is coupled to the transponder IC 12a and is a conventional inductive antenna coil termed a "dual-function antenna coil" which performs both the receiving and transmitting functions of the transponder 12. Alternatively, two separate receiving and transmitting antenna coils (not shown) can be substituted for the single dual-function antenna coil in the transponder 12. The transponder 12 also preferably includes an external transponder tuning capacitor (not shown) coupled to the transponder IC 12a and to each antenna coil of the transponder antenna 12b. The term "external" is used above with respect to the transponder 12 to designate electronic components which are not physically or functionally included within the transponder IC 12a.

The term "tuning capacitor" is used herein to describe a capacitor preferably having a fixed capacitance which, in cooperation with the transponder antenna 12b, establishes the transponder frequency of the transponder 12. The term "tuned resonant frequency" is used herein to describe a resonant frequency of the transponder LC circuit which is typically fixed at the time of transponder manufacture by selection of a specific transponder antenna and a specific cooperative tuning capacitor. Thus, the tuned resonant frequency of the transponder LC circuit in the transponder 12 is preferably non-adjustable after manufacture of the transponder. The term "transponder frequency" corresponds to the tuned resonant frequency of the transponder LC circuit in the transponder 12 and likewise to the carrier frequency of the transponder 12.

The transponder 12 is preferably a specific type of low frequency transponder or high frequency transponder having a distinct transponder signature. In any case, the transponder 12 described herein is but one example of any number of transponders having utility in the present RFID system 10. It is understood that practice of the present invention is not limited to any one type of transponder having a specific frequency, communication protocol, or circuit design, but is generally applicable to any number of transponders having utility in RFID systems.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of both the transponder and reader. In the case of a portable reader and a portable transponder, the user may move both the portable reader and the portable transponder into relative proximity with one another to enable simultaneous operation of both the transponder and reader. Embodiments of the present invention are not limited to any one of the above-recited RFID system configurations.

The reader 14 is generally characterized as being capable of detecting the presence of the transponder 12 in proximity thereto, determining the type of the detected transponder 12, and thereafter contactlessly communicating information between the reader 14 and the transponder 12. The reader 14 comprises a number of functional elements including a reader antenna assembly 20, an exciter/reader (ER) circuit 22, a main controller 24, a wakeup unit 26, an input/output (I/O) interface 28, and a power supply 30.

The power supply 30 provides electrical operating power to the reader components in a controlled manner. In accordance with one embodiment, the power supply 30 is coupled to a finite electrical power source which is self-contained (i.e., internal) within the reader 14, such as a relatively small portable battery consisting of one or more disposable cells or rechargeable cells, wherein the cells are wet or dry. Alternatively, the power supply 30 is hard wired to an essentially infinite remote electrical power source, such as an electric utility.

The ER circuit 22 comprises an excitation signal generator circuit 31 and a transponder signal receiver circuit 32. The excitation signal generator circuit 31 generally functions to generate an excitation signal which the reader antenna assembly 20 transmits in the form of electromagnetic waves into the open space of the external environment surrounding the reader 14. The excitation signals are received by the transponder 12 in the proximal space of the reader 14 (i.e., within a read range of the reader) to power up the transponder 12. Upon activation, the transponder IC 12a generates a transponder data signal, which contains readable information, i.e., transponder data, copied or otherwise derived from the memory of the transponder IC 12a. The transponder data signal is transmitted into the open space of the external environment surrounding the transponder 12 via the transponder antenna 12b. When a transponder data signal is received at the reader antenna assembly 20, the transponder signal receiver circuit 32 performs various operations on the transponder data signal to condition the signal, thereby producing a conditioned signal which is suitable for reading by the reader 14.

The conditioned signal containing the data from the transponder data signal is conveyed to the main controller 24, which processes the conditioned signal to extract the readable transponder data contained therein. In particular, the main controller 24 demodulates the conditioned signal in accordance with a respective modulation type according to firmware and/or software executed by the main controller 24. The resulting extracted transponder data may be sent to an external device such as a central host computer (not shown) via the I/O interface 28. The main controller 24 is preferably substantially any device which is capable of processing the transponder data signal and directing certain other functional operations of the reader 14 as recited below. Thus, for example, the main controller 24 can be a microprocessor or an application specific integrated circuit (ASIC).

As noted above, the excitation signal generator circuit 31 and the transponder signal receiver circuit 32 in combination are termed the ER circuit 22. Skilled artisans can appreciate that the reader 14 can be adapted in accordance with the present invention to include a writer circuit (not shown) which is capable of writing programming instructions or other information to a transponder by either contact or contactless means. The ER circuit and writer circuit in combination are termed an exciter/reader/writer (ERW) circuit.

Figure 2:
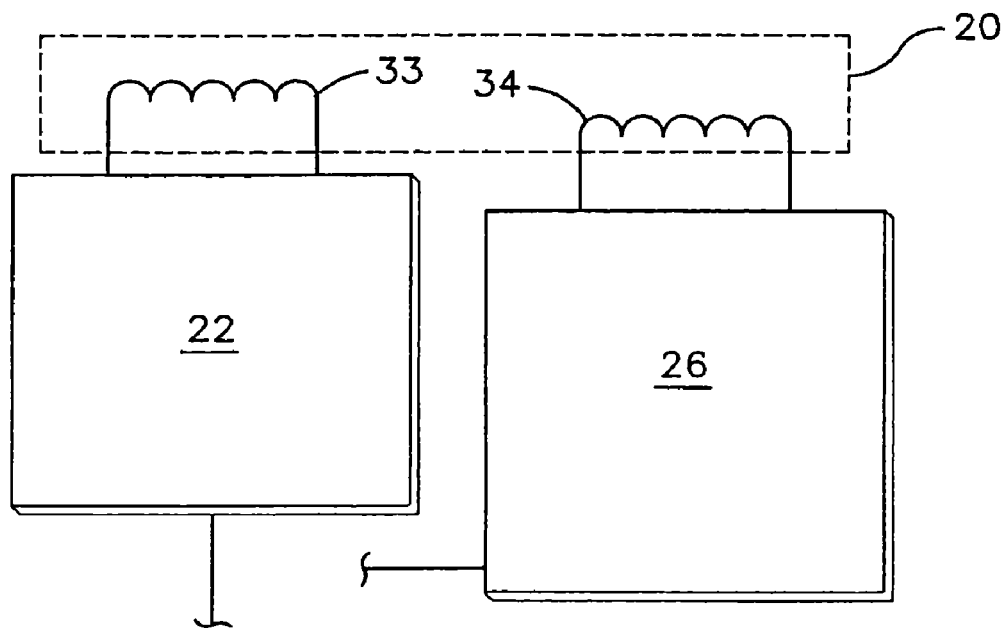
FIG. 2 is a block diagram of an embodiment of the reader antenna assembly of FIG. 1.

The reader antenna assembly 20 encompasses a number of alternate embodiments. Referring to FIG. 2, an embodiment of the reader antenna assembly 20 is shown and described which consists of two separate antenna coils 33, 34. The first antenna coil 33 is an ER antenna coil coupled and functionally dedicated to the ER circuit 22. The second antenna coil 34 is a wakeup antenna coil coupled and functionally dedicated to the wakeup unit 26. The ER antenna coil 33 is preferably associated with an ER tuning capacitor (not shown) thereby forming an ER LC circuit. The wakeup antenna coil 34 is preferably associated with a wakeup tuning capacitor (not shown), thereby forming a wakeup LC circuit. The ER antenna coil 33 shown herein is a dual-function antenna coil which performs both the receiving and transmitting functions of the ER circuit 22. The wakeup antenna coil 34 shown herein is similarly a dual-function antenna coil which performs both the receiving and transmitting functions of the wakeup unit 26 described below.

Although not shown, the reader antenna assembly 20 alternately includes an ER antenna having two separate ER antenna coils, each of which is a single-function antenna coil. In particular, the first ER antenna coil is a receiving ER antenna coil and the second ER antenna coil is a transmitting ER antenna coil. The receiving and transmitting ER antenna coils separately perform the receiving and transmitting functions, respectively, of the ER circuit 22. In another alternative, the reader antenna assembly 20 includes an ER antenna having a separate dual-function ER antenna coil for each different detection signal frequency generated by the ER circuit 22 as described hereafter. Each ER antenna coil performs both the receiving and transmitting functions of the ER circuit 22 for only one detection signal frequency. In still another alternative, the reader antenna assembly 20 includes an ER antenna having two separate ER antenna coils for each different detection signal frequency generated by the ER circuit 22. Each of the two ER antenna coils for a given detection signal frequency is a single-function antenna coil. The first ER antenna coil is a receiving ER antenna coil which performs the receiving function of the ER circuit 22 for only that given detection signal frequency. The second ER antenna coil is a transmitting ER antenna coil which performs the transmitting function of the ER circuit 22 for only that given detection signal frequency.

The reader antenna assembly 20 similarly alternately includes a wakeup antenna having two separate wakeup antenna coils, each of which is a single-function antenna coil. In particular, the first wakeup antenna coil is a receiving wakeup antenna coil and the second wakeup antenna coil is a transmitting wakeup antenna coil. The receiving and transmitting wakeup antenna coils separately perform the receiving and transmitting functions, respectively, of the wakeup unit 26. In another alternative, the reader antenna assembly 20 includes a wakeup antenna having a separate dual-function wakeup antenna coil for each different transponder frequency encountered by the wakeup unit 26 as described hereafter. Each wakeup antenna coil performs both the receiving and transmitting functions of the wakeup unit 26 for only one transponder frequency. In still another alternative, the reader antenna assembly 20 includes a wakeup antenna having two separate wakeup antenna coils for each different transponder frequency encountered by the wakeup unit 26. Each of the two wakeup antenna coils for a given transponder frequency is a single-function antenna coil. The first wakeup antenna coil is a receiving wakeup antenna coil which performs the receiving function of the wakeup unit 26 for only that given detection signal frequency. The second wakeup antenna coil is a transmitting wakeup antenna coil which performs the transmitting function of the wakeup unit 26 for only that given detection signal frequency.

Figure 3:
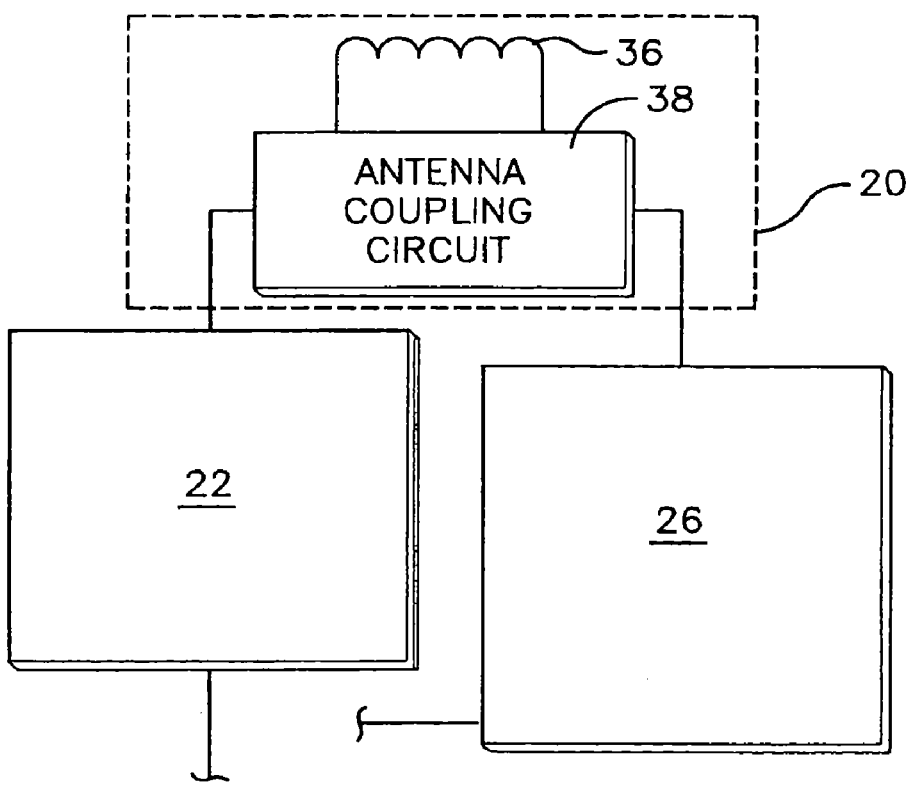
FIG. 3 is a block diagram of an alternate embodiment of the reader antenna assembly of FIG. 1.

Referring to FIG. 3, an alternate embodiment of the reader antenna assembly 20 consists of a single reader antenna coil 36 coupled to an antenna coupling circuit 38. The reader antenna coil 36 is preferably associated with a reader tuning capacitor (not shown) to form a reader LC circuit. The antenna coupling circuit 38 is coupled between the ER circuit 22 and the wakeup unit 26 and enables the reader LC circuit to perform the transmitting and receiving functions of both the ER circuit 22 and the wakeup unit 26. As noted above, the reader antenna coil 36 shown herein is a dual-function antenna coil which performs the receiving and transmitting functions of both the ER circuit 22 and the wakeup unit 26. Although not shown, the reader antenna assembly 20 alternately includes a reader antenna having a receiving reader antenna coil and a separate transmitting reader antenna coil. The receiving reader antenna coil performs the receiving functions of both the ER circuit 22 and the wakeup unit 26, while the transmitting reader antenna coil performs the transmitting functions of both the ER circuit 22 and the wakeup unit 26. In still another alternative, the reader antenna assembly 20 includes a reader antenna having a dual-function reader antenna coil for each different detection signal frequency generated by the ER circuit 22, or having a receiving reader antenna coil and a separate transmitting reader antenna coil, respectively, for each different detection signal frequency generated by the ER circuit 22.

The reader 14 has at least two modes of operation, namely, a low power detection mode and a high power data transaction mode (alternately referred to as a "read mode"). The detection mode is the initial operating mode of the reader 14, wherein the wakeup unit 26 functions as a transponder detector to actively seek any transponders 12 residing in the surrounding space proximal to the reader 14, i.e., within the read range of the reader 14. Since the ER circuit 22 and main controller 24 are characterized as having a high power demand when performing read mode functions, the reader 14 is configured to deactivate most or all of the components and functions associated with the ER circuit 22, main controller 24 and I/O interface 28 during the detection mode. Substantial power savings are achieved by using the wakeup unit 26 as the sole or primary operating unit for performing the transponder detection function during the detection mode because the wakeup unit 26 is characterized as having a low power demand. Although the wakeup unit 26 is shown herein as being structurally and functionally integral with the reader 14, it is apparent to the skilled artisan applying the teaching herein that the wakeup unit 26 can alternately be constructed and/or adapted to function as a stand-alone transponder detector apart from the reader 14.

The wakeup unit 26 comprises a detection signal generator circuit 40, a response signal receiver circuit 42, a wakeup controller 44 and a timer 46. The wakeup controller 44 is configured to control operation of the wakeup unit 26 as described in greater detail below. As such, the wakeup controller 44 is preferably substantially any device which is capable of directing functional operation of the wakeup unit 26. For example, the wakeup controller 44 can be a microprocessor or an application specific integrated circuit (ASIC).

The timer 46 is coupled to the wakeup controller 44 and periodically generates wakeup interrupt signals for the wakeup controller 44, which initiate the active detection steps of the wakeup unit 26. An exemplary timer 46 is a low power timing means, such as a watchdog, which provides timing cues to the wakeup controller 44. Alternatively, although not shown, the timer is an internal timer included within, or otherwise integral with, the wakeup controller 44 or main controller 24. To further reduce power consumption during the detection mode, the wakeup controller 44 preferably remains in a SLEEP state (i.e., a reduced power state) throughout the detection mode, only switching to an awake state (i.e., an increased power state) when the wakeup controller 44 receives a wakeup interrupt signal from the timer 46.

The detection signal generator circuit 40 is coupled between the reader antenna assembly 20 and the wakeup controller 44 to generate detection signals. The detection signal is preferably a ring signal in the form of a decaying sine wave. The detection signal generator circuit 40 is capable of generating a serial progression of detection signals at a plurality of different frequencies in a manner described below. Also coupled between the reader antenna assembly 20 and the wakeup controller 44 is the response signal receiver circuit 42, which is capable of receiving a serial progression of analog response signals from the reader antenna assembly 20 resulting from the transmission of the serial progression of detection signals on the reader antenna assembly 20, and more particularly on the wakeup antenna coil 34 or reader antenna coil 36.

In one embodiment, the response signal receiver circuit 42 is configured to sample and hold the analog response signals and convey the analog response signals to the wakeup controller 44. The wakeup controller 44 preferably includes an analog to digital converter (ADC) 48 which receives the analog response signals from the response signal receiver circuit 42 and converts them to digital response signals. The wakeup controller 44 processes the resulting digital response signals, preferably using a digital signal processing (DSP) algorithm, to detect the presence of the transponder 12 within the read range of the reader 14. The wakeup controller 44 further uses the DSP algorithm to determine the type of the transponder 12, if present, by comparing the ascertained signature of the transponder 12 (i.e., the specific transponder frequency) to known transponder signatures used by different transponder manufacturers. If the wakeup controller 44 detects the transponder 12 and determines the transponder type, the wakeup controller 44 sends a transponder recognized signal to the main controller 24 indicating that the transponder 12 has been detected and the type determined.

The main controller 24 activates the ER circuit 22 in response to the transponder recognized signal, thereby switching the reader 14 from the low power detection mode to the high power data transaction mode. The specific activation function is preferably performed by the power management application 49 located within the main controller 24. In addition to controlling power consumption of components external to the main controller 24, the power management application 49 also preferably controls power consumption relating to various internal functions of the main controller 24 by selectively powering off internal segments of the main controller 24 which are not in use during the detection or data transaction modes.

Figure 4:
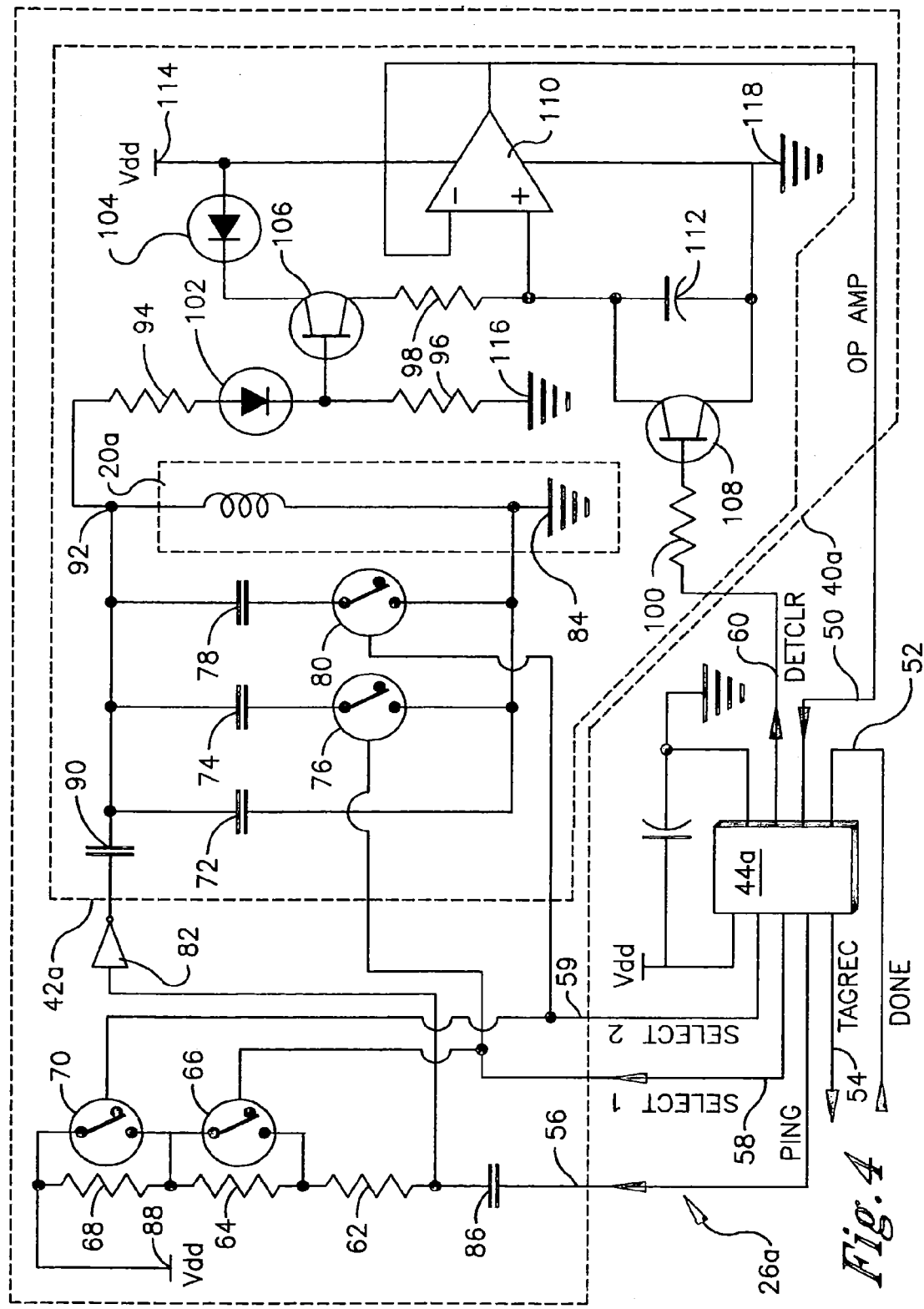
FIG. 4 is a schematic view of an embodiment of the wakeup unit of FIG. 1.

Referring to FIG. 4, an embodiment of a wakeup unit of the present invention is shown and designated 26a. Elements of FIG. 4 which are specific embodiments of elements shown generally in FIG. 1 are designated by the same reference character, but with the suffix "a" added. The wakeup unit 26a is configured to generate a serial progression of detection signals at a plurality of different frequencies. The wakeup unit 26a comprises a detection signal generator circuit 40a, a response signal receiver circuit 42a, and a wakeup controller 44a. In addition a cooperative antenna assembly 20a is associated with the wakeup unit 26a. The wakeup controller 44a is provided with OP_AMP and DONE inputs 50, 52 to receive OP_AMP and DONE input signals, respectively. The wakeup controller 44a is further provided with TAGREC, PING, SELECT1, SELECT2, and DETCLR outputs, 54, 56, 58, 59, 60 to send TAGREC, PING, SELECT1, SELECT2, and DETCLR output signals, respectively, which are generated by the wakeup controller 44a.

The wakeup controller 44a of the present embodiment is shown having two select signal outputs, i.e., SELECT1 output 58 and SELECT2 output 59, for purposes of illustration. It is within the scope of the present invention, for the wakeup controller 44 to have any integer number N of select signal outputs. Accordingly, each select signal output of the wakeup controller 44 is generally designated SELECTX output, on which a SELECTX output signal generated by the wakeup controller 44 is sent, wherein X=1, 2, 3 . . . N. The precise value of X for a given embodiment of the wakeup controller 44 is determined by the number of switched resistor/capacitor pairs in the detection signal generator circuit 40a as described below.

The detection signal generator circuit 40a includes an unswitched series resistor 62, a first switched series resistor 64, a first resistance switch 66, a second switched series resistor 68, a second resistance switch 70, a first unswitched parallel capacitor 72, a first switched parallel capacitor 74, a first capacitance switch 76, a second switched parallel capacitor 78, a second capacitance switch 80, and an inverter 82 which is connected between the series resistance 62, 64, 66, 68, 70 and the parallel capacitance 72, 74, 76, 78, 80. The first resistance switch 66 is connected between the two terminals of the first switched series resistor 64 and the second resistance switch 70 is connected between the two terminals of the second switched series resistor 68. The first capacitance switch 76 is connected between the first switched parallel capacitor 74 and ground 84 and the second capacitance switch 80 is connected between the second switched parallel capacitor 78 and ground 84. The ground 84 is alternatively a negative voltage source. An exemplary voltage value is 0 VDC.

The first resistance and capacitance switches 66, 76 are coupled to the SELECT1 output 58 to receive SELECT1 output signals. The second resistance and capacitance switches 70, 80 are coupled to the SELECT2 output 59 to receive SELECT2 output signals. A first capacitor 86 is connected between the PING output 56 and the series resistance, such that the series resistance receives PING output signals via the PING output 56 and first capacitor 86. A first voltage source (+$V_{dd}$) 88 is coupled to a terminal of the second switched series resistor 68. An exemplary voltage value of the first voltage source 88 is 4+/−1 VDC.

The resistance and capacitance switches 66, 70, 76, 80 comprise any suitable switching element or combination of switching elements. For example, switching elements may be selected from among Bipolar Junction Transistors (BJTs), Field-Effect Transistor (FET) switches, Metal Oxide Semiconductor Field-Effect Transistor (MOSFET) switches, relays, electrically programmable resistance (EPOTs), and analog switches. The SELECT1 output signals open or close the first resistance and capacitance switches 66, 76 and the SELECT2 output signals similarly open or close the second resistance and capacitance switches 70, 80, thereby selectively controlling the frequency of the detection signals generated by the detection signal generator circuit 40a in a manner described below.

A second capacitor 90 is connected between the inverter 82 and the parallel capacitance. The parallel capacitance is coupled to ground 84 and the antenna assembly 20a via an antenna input/output node 92. Thus, the antenna assembly 20a is connected in parallel with the first unswitched parallel capacitor 72, first switched parallel capacitor 74, and second switched parallel capacitor 78. As such, the output of the parallel capacitance (and correspondingly the input to the antenna assembly 20a) is the antenna input/output node 92. Although the inverter 82 is shown herein as a single element, any suitable number of inverter elements may be included within the inverter 82 to achieve a desired power and/or range of the detection signal for a particular antenna assembly 20a.

The detection signal generator circuit 40a further comprises first, second, third and fourth resistors 94, 96, 98, 100, first and second diodes 102, 104, first and second transistors 106 and 108, an operational amplifier 110, a third capacitor 112, and a second voltage source (+$V_{dd}$) 114. The input to the first resistor 94 is the antenna input/output node 92. The base of the first transistor 106 is connected between the first diode 102 and the second resistor 96. The opposite end of the second resistor 96 is connected to ground 116. The emitter of the first transistor 106 is connected to the third resistor 98 and the collector of the first transistor 106 is connected to the second voltage source 114 via the second diode 104. The emitter of the second transistor 108 is connected to ground 118, the collector of the second transistor 108 is connected to the non-inverting input of the operational amplifier 110, and the base of the second transistor 108 is connected to the DETCLR output 60 via the fourth resistor 100 to receive the DETCLR (detection clear) output signal from the wakeup controller 44a.

The operational amplifier 110 is connected between the second voltage source 114 (which preferably has a voltage value less than the first voltage source 88) and ground 118. As noted above, the noninverting input of the operational amplifier 110 is connected to the collector of the second transistor 108. The output of the operational amplifier 110 is connected to its inverting input and to the OP_AMP input 50, enabling the wakeup controller 44a to receive analog OP_AMP input signals from the operational amplifier 110.

The wakeup controller 44a initiates a serial progression of detection signals by periodically generating and sending a plurality of preferably identical PING output signals (also termed pulse signals) via the PING output 56. Each PING output signal is routed in series through the first capacitor 86, series resistance, inverter 82, series capacitance, and antenna input/output node 92 to the antenna assembly 20a, thereby producing a ring signal (i.e., detection signal) on the coil of the antenna assembly 20a. The inverter 82 preferably shapes each PING output signal to a selected width and amplitude, wherein the pulse width is preferably selected as a function of the tuned frequency of the LC circuit of the ER circuit 22 and the tuned frequency of the LC circuits of any transponders expected within the read range of the reader 14. An exemplary selected pulse width is 36.9 nanoseconds, which produces a wavy detection signal in the form of a decaying sine wave at 13.56 MHz on the coil of the antenna assembly 20a.

The detection signal generator circuit 40a employs the series resistance and parallel capacitance, which are responsive to specific SELECT1 and SELECT2 output signals, to selectively raise or lower the frequency value of the detection signals generated by the detection signal generator circuit 40a from a baseline or middle frequency value. In this manner, the detection signal generator 40a is able to generate a progression of detection signals, wherein each detection signal in the progression has a different frequency value.

In the present embodiment illustrated in FIG. 4, the detection signal generator circuit 40a is able to generate a serial progression of three different detection signals, each detection signal having a high frequency value, a middle frequency value, or a low frequency value, respectively. In particular, the detection signal generator 40a generates a first detection signal of the progression having the low frequency value by closing both the first and second capacitance switches 76, 80 and opening both the first and second resistance switches 66, 70, which increases both the capacitance and resistance to a high level. The detection signal generator 40a generates a second detection signal of the progression having the middle frequency value by opening the second capacitance switch 80, while maintaining the first capacitance switch 76 closed and closing the second resistance switch 70, while maintaining the first resistance switch open 66, which reduces both the capacitance and resistance to a middle level. The detection signal generator 40a generates a second detection signal of the progression having the high frequency value by opening both the first and second capacitance switches 76, 80 and closing both the first and second resistance switches 76, 80, which reduces both the capacitance and resistance to a low level.

The values of the series resistors 62, 64, 68 and the parallel capacitors 72, 74, 78 and other elements of the detection signal generator circuit 40a are selected to generate the desired range of frequencies within the detection signal progression. The types of transponders which the wakeup unit 26a is capable of detecting and with which the reader 14 is capable of communicating are dictated by the range of detection signal frequencies generated by the detection signal generator circuit 40a. For example, the detection signal generator circuit 40a can be configured to generate a progression of detection signals having frequencies in a range from about 13 MHz to 18 MHz, thereby enabling detection and identification of transponder types having transponder frequencies within a corresponding range. Alternatively, the detection signal generator circuit 40a can be configured to generate a progression of detection signals having frequencies in a range from about 100 kHz to 150 kHz. It is understood that the present invention is not limited to any one detection signal frequency range and that the detection signal generator circuit 40*a* can be configured to cover any suitable frequency range desired and any desired frequency values within the selected frequency range.

The detection signal generator circuit 40*a* of the present embodiment is shown by way of illustration as having a first switched resistor/capacitor pair 64, 74 and a second switched resistor/capacitor pair 68, 78 to generate a progression of detection signals at three different frequencies within a given frequency range. It is understood that the detection signal generator circuit 40 can have any integer number N of switched resistor/capacitor pairs (and correspondingly N select signal outputs as noted above). As N increases, the range and number of frequencies within the detection signal progression that the detection signal generator circuit 40 is capable of generating increases as well. For example, if N=3, the detection signal generator circuit 40 can generate a serial progression of four detection signals, each having a different frequency. The frequency of the detection signals is set by selectively opening or closing the respective switches to the elements within each of the N switched resistor/capacitor pairs in a substantially similar manner as described above with respect to the two switched resistor/capacitor pairs 64, 74 and 68, 78.

The present detection signal generator circuit 40*a* can be alternately configured to generate a single detection signal at one frequency if desired. A single frequency embodiment of the detection signal generator circuit 40 is configured by removing or simply not using the first and second switched series resistors 64, 68 and the first and second switched parallel capacitors 74, 78 in the detection signal generator circuit 40*a* of FIG. 4 and deactivating the SELECT1 and SELECT2 outputs 58, 59.

The response signal receiver circuit 42*a* of the wakeup unit 26*a* comprises a number of elements which are also employed in the detection signal generator circuit 40*a* as described above. In particular, the response signal receiver circuit 42*a* comprises the above-recited parallel capacitance, first, second, third and fourth resistors 94, 96, 98, 100, first and second diodes 102, 104, first and second transistors 106 and 108, operational amplifier 110, third capacitor 112, second voltage source 114, and antenna input/output node 92.

Each detection signal of the serial progression routed to the antenna assembly 20*a* via the antenna input/output node 92 generates a corresponding analog response signal on the antenna assembly 20*a* which is input to the response signal receiver circuit 42*a* via the antenna input/output node 92. The response signal receiver circuit 42*a* conditions the analog response signal and conveys the conditioned response signal as the analog OP_AMP input signal to the wakeup controller 44*a* via the OP_AMP input 50. The ADC 48 (shown in FIG. 1) of the wakeup controller 44*a* converts the analog OP_AMP input signal to a digital response signal. The wakeup controller 44*a* processes the resulting digital response signal and each succeeding response signal in the resulting progression of response signals using the DSP algorithm to evaluate the decay rate of the response signal wave form.

It is noted that the decay rate of the progression of response signals is one of any number of preferred detection parameters which may be used to detect the presence of the transponder 12 and confirm the type of detected transponder 12. The decay rate may be expressed as a short-term or long-term average or as both. Historical values of the decay rate may also be used to determine a current threshold level for the decay rate.

Alternate detection parameters are well known to the skilled artisan. For example, the wakeup controller 44*a* may alternatively be programmed to compute average voltage of the progression of response signals as a preferred detection parameter. Alternatively, or in addition, the wakeup controller 44*a* may be programmed to compute an amount of detection signal energy absorbed by the surrounding environment based on an evaluation of the progression of analog response signals (i.e., the OP_AMP input signals) as a preferred detection parameter.

Once the wakeup controller 44*a* determines the presence and type of the transponder 12 using one or more detection parameters, the wakeup controller 44*a* forwards a TAGREC (transponder recognized) output signal to the main controller 24 (shown in FIG. 1) via the TAGREC output 54. When the TAGREC output signal has been sent, the wakeup unit 26*a* assumes an excitation signal will be generated and transmitted by the ER circuit 22 (shown in FIG. 1) and the reader antenna assembly 20. Assertion of the DETCLR output signal to the base of the second transistor 108 via the DETCLR output 60 at this time or at any other time as desired effectively clears the wakeup unit 26*a*. The first and second diodes 102, 104 protect the power supply rail from pumping in the event the voltage of excitation signals is greater than the supply voltage.

Operation of the wakeup controller 44, timer 46 and ADC 48 as described above is preferably enabled by the DSP algorithm stored in the wakeup controller 44. It is alternately within the scope of the present invention to store the DSP algorithm in the main controller 24 of the associated reader 14, thereby eliminating the wakeup controller 44, timer 46 and ADC 48 from the wakeup unit 26. In accordance with this alternate embodiment, the functions of the wakeup controller 44, timer 46 and ADC 48 are performed by the main controller 24 employing the DSP algorithm.

Figure 5:
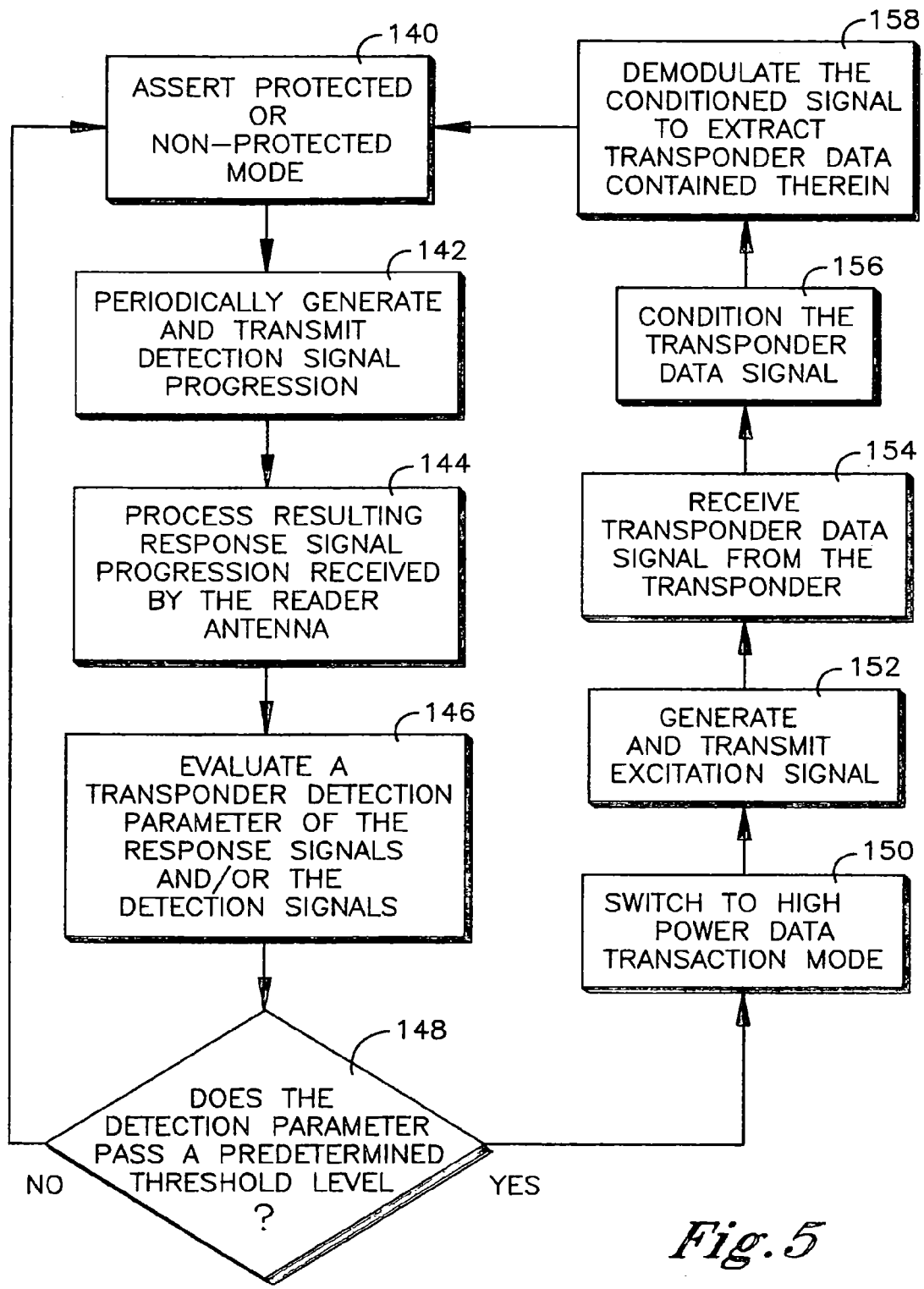
FIG. 5 is a flowchart illustrating a transponder detection method applicable to the wakeup unit of FIG. 1.

A method of performing the detection mode and the associated data transaction mode which employs the reader 14 of FIG. 1 including the wakeup unit 26*a* of FIG. 4 is shown and described below with reference to FIG. 5. The low power detection mode is the default mode of operation for the reader 14. Accordingly, powering up the reader 14 automatically initiates the low power detection mode and the reader 14 continues to operate in the low power detection mode until the wakeup unit 26*a* detects the transponder 12 in the read range of the reader 14. The main controller 24, which manages the power consumption of all reader circuits with the exception of the wakeup unit 26*a*, maintains all managed circuits, and particularly the ER circuit 22, in the low power state until the wakeup unit 26*a* signals the main controller 24 that the transponder 12 has been detected in the read range of the reader 14. Once the transponder 12 is detected, the reader 14 switches to the high power data transaction mode, but automatically switches back to the low power detection mode when the high power data transaction mode is completed.

Block 140 represents the initiation step of the present frequency ranging method for operating the wakeup unit 26*a*, wherein the wakeup unit 26*a* is either in a protected or a non-protected mode. Blocks 142-148 generally describe operation of the wakeup unit 26*a* in the protected or non-protected mode, wherein the wakeup unit 26*a* seeks the transponder 12 in the read range of the reader 14. In block 142 the wakeup unit 26*a* actively seeks the transponder 12 in the surrounding space of the reader 14 while in the low power detection mode. In particular, the detection signal generator circuit 40*a* periodically generates and transmits a serial progression of detection signals at different frequencies into the surrounding space of the reader 14. The serial progression of detection signals comprise at least two detection signals, each generated at a different frequency, and, more preferably comprises 3 or more detection signals, each at a different frequency.

A progression of response signals occurs on the antenna assembly 20*a* as a result of transmitting the progression of detection signals from the antenna assembly 20*a*. The antenna assembly 20*a* conveys the resulting progression of response signals to the response signal receiver circuit 42*a* of the wakeup unit 26. The response signal receiver circuit 42*a* applies a sample and hold technique to the response signals and processes the response signals using the wakeup controller 44*a* as shown in block 144 to determine if the transponder 12 is present in the read range of the reader 14.

Figure 6A:
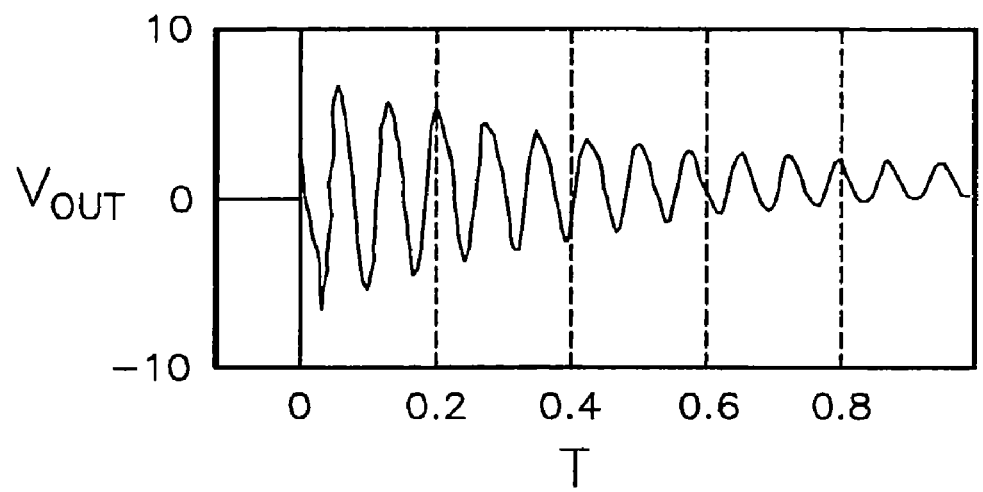
FIG. 6A is a graph showing an example of a detection signal in the form of a sine wave which is decaying at a rate corresponding to the absence of a transponder in the proximal space of the wakeup unit of FIG. 1.
Figure 6B:
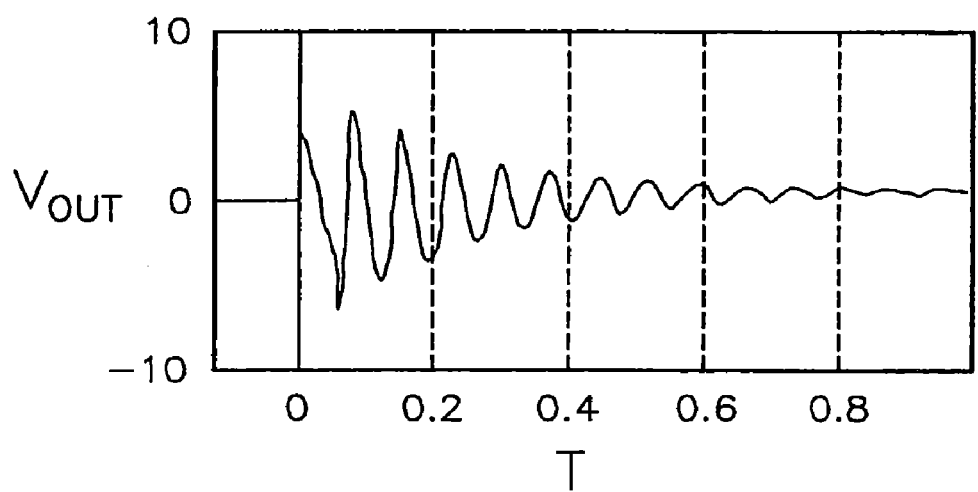
FIG. 6B is a graph showing an example of a detection signal in the form of a sine wave which is decaying at an accelerated rate corresponding to the presence of a transponder in the proximal space of the wakeup unit of FIG. 1.

The detection step shown in block 146 encompasses a number of different techniques for determining whether the transponder 12 is present in the read range. In general, each detection technique used by the response signal receiver circuit 42*a* processes the response signal to evaluate one or more selected transponder detection parameters. For example, if the detection signal is a ring signal in the form of a decaying sine wave and no transponder 12 is present in the read range of the reader 14, the detection signal will have a slow decay rate as shown in FIG. 6A, which is evident in the corresponding response signal. The slow decay rate is attributable to the relatively high Q value of the reader LC circuit. However, when the transponder 12 tuned to essentially the same frequency as the detection signal is brought into the read range of the reader 14, the transponder 12 absorbs a portion of the energy from the detection signal causing the detection signal to decay at a faster rate within the reader LC circuit as shown in FIG. 6B and producing a corresponding faster decaying response signal.

In the present example, the transponder 12 residing in the read range of the reader 14 is detected by evaluating the decay rate of each response signal obtained on the antenna assembly 20*a* relative to a dynamic response threshold level. The response threshold level is termed a dynamic level because the level can vary over time in reaction to operational feedback. In any case, if the decay rate does not reach or pass the dynamic response threshold level (block 148, no), the method returns to block 140 where the wakeup controller 44*a* assumes no transponder 12 is present in the read range of the reader 14 and remains in the low power detection mode. However, if the decay rate reaches or passes the dynamic response threshold level (block 148, yes), the wakeup controller 44*a* assumes the transponder 12 is present in the read range of the reader 14. The wakeup controller 44*a* also determines the type of the transponder 12 by ascertaining the signature of the transponder 12 and correlating the transponder signature with known transponder signatures of existing commercially-available transponders. Upon completion of these tasks, the wakeup controller 44*a* generates and conveys the TAGREC signal to the main controller 24.

Alternatively or additionally, the transponder 12 is detected by evaluating changes in the amount of detection signal energy absorbed by the surrounding environment. In a similar manner as above, if the amount of detection signal energy absorbed by the surrounding environment does not reach or pass the dynamic response threshold level (block 148, no), the method returns to block 140 where the wakeup controller 44*a* assumes no transponder 12 is present in the read range of the reader 14. However, if the amount of detection signal energy absorbed by the surrounding environment reaches or passes the dynamic response threshold level (block 148, yes), the wakeup controller 44*a* assumes the transponder 12 is present which has a transponder frequency corresponding to the detection signal frequency.

The functions of blocks 140-148 are directed by execution of the DSP algorithm within the wakeup controller 44*a*. A more detailed description of the sequential functional steps directed by execution of the DSP algorithm, which fit within the generalized functional template of blocks 140-148 is set forth as follows:

1) wakeup controller 44 is in SLEEP state;
2) timer 46 signals change of wakeup controller 44 to AWAKE state;
3) prior or initial reading of transponder detection parameter is cleared from memory of wakeup controller 44 by asserting DETCLR output signal;
4) DETCLR output signal is de-asserted;
5) SELECTX output signal is asserted then PING output signal is asserted and de-asserted;
6) brief time period expended to permit operational amplifier 110 to slew to a valid analog OP_AMP input signal
7) wakeup controller 44 clock rate is boosted to accelerate processing functions;
8) ADC 48 turned on and instructed to run;
9) brief time period expended for ADC 48 to perform analog to digital conversion of analog OP_AMP input signal;
10) ADC 48 shut off;
11) composite energy due to mutual coupling of the antenna assembly 20 and transponder 12 at a given frequency (e.g. 13.56 MHz) or a near beat frequency of the detection signal is sampled and recorded;
12) rolling sum average for the frequency of the detection signal is maintained, both long-term and short-term;
13) rolling sum average based on a time interval allowing the wakeup unit 26 to adapt to metallic environments (metal reduces sensitivity of the wakeup unit 26, yet is compensated for by wakeup unit 26);
14) if change is seen in the transponder detection parameter greater than the current sensitivity setting of the wakeup unit 26, a detect event has occurred;
15) detect events for a progression of detection signals are correlated and further discriminated to categorically determine the type of the transponder 12 detected;
16) processing rate of wakeup controller 44 reduced to a minimum;
17) transponder detection and type determination reported to main controller 24 by asserting TAGREC output signal (TAGREC output signal is a categorized table of pulses for a progression of detection signals);
18) DONE input signal asserted to signal application is complete;
19) wakeup controller 44 returns to SLEEP state;
20) timer 46 signals change of wakeup controller 44 to AWAKE state.

The period of steps 1-20 above provides a basis for setting the rate that the PING output signals are generated by the wakeup unit 26. Thus, the time interval that the wakeup controller 44 is in the SLEEP state (i.e., the SLEEP time interval) is adjustable.

Blocks 150-158 generally describe operation of the reader 14 in the data transaction mode once the wakeup controller 44*a* detects the transponder 12 and determines the type of the transponder 12. In particular, block 150 shows switching of the reader 14 from the low power detection mode to the high power data transaction mode. Switching is effectuated by the main controller 24, which transitions various components of the reader 14 including the ER circuit 22 to a high power activated state. When the reader 14 is in the high power data transaction mode, the reader 14 preferably operates in the manner of a conventional contactless reader to communicate with the detected transponder 12. As such, the main controller 24 directs the excitation signal generator circuit 31 to generate an excitation signal as shown in block 152. The excitation signal is transmitted via the reader antenna assembly 20 into the surrounding space of the reader 14 where it is received by the transponder 12 residing in the read range of the reader 14. The excitation signal activates the transponder 12, which generates and transmits a transponder data signal, typically containing data associated with the transponder 12.

The reader 14 receives the transponder data signal as shown in block 154 and proceeds to block 156 where the transponder signal receiver circuit 32 of the reader 14 conditions the transponder data signal. The conditioned signal containing the data of the transponder data signal is conveyed to the main controller 24, which demodulates the conditioned signal to extract the data contained therein, thereby reading the transponder data signal as shown in block 158.

Once all desired data transactions have been completed between the transponder 12 and reader 14 in accordance with blocks 152 through 158, the method returns to block 140 where the non-protected or protected mode is reasserted and the reader 14 awaits detection of another transponder in the read range of the reader 14 by the wakeup unit 26. More specifically, when all desired data transactions are completed, the main controller 24 signals various components of the reader 14 including the ER circuit 22 to transition to the low power detection mode. The main controller 24 may also go to a low power state itself by using the power management application 49 to selectively deactivate various internal functions of the main controller 24. Upon completing the desired data transactions, the main controller 24 forwards a DONE input signal to the wakeup unit 26a which indicates that the main controller 24 has completed its read function.

When a different transponder 13 (shown in FIG. 1) enters the read range of the reader 14, blocks 140-148 are repeated for the transponder 13. The transponder 13 may be a different type or the same type of transponder as the transponder 12. It is further within the scope of the present invention, applying the teaching recited herein, to use the wakeup unit 26a to detect both transponders 12, 13 essentially simultaneously while both transponders 12, 13 are simultaneously present in the read range of the reader 14 and to use the wakeup unit 26a to determine the type of each transponder 12, 13.

The present invention provides an alternate embodiment of the method for operating the wakeup unit 26a in the low power detection mode, wherein the DSP algorithm imposes additional steps for protecting the response signal receiver circuit 42a of FIG. 4 from incoming high voltage antenna signals. The response signal receiver circuit 42a typically includes circuit elements which can be damaged by incoming high voltage antenna signals received from the reader antenna assembly 20a via the antenna output node 92. For example, if the strength of an incoming antenna signal received at the antenna input/output node 92 is high enough, the incoming antenna signal may charge pump the first transistor 106 such that the voltage level at the node connecting the third resistor 98 and noninverting input of the operational amplifier 110 exceeds the supply voltage of the operational amplifier 110.

When the voltage level at the noninverting input of the operational amplifier 110 exceeds its upper voltage tolerance (i.e., an unsafe threshold level), the incoming high voltage antenna signal can damage the operational amplifier 110. Accordingly, the wakeup controller 44a implements a protection function which selectively switches the response signal receiver circuit 42a between the protected mode and the unprotected mode. When the response signal receiver circuit 42a is in the unprotected mode, the response signal receiver circuit 42 receives incoming high voltage antenna signals from the antenna input/output node 92 and conveys them to the wakeup controller 44a via the operational amplifier 110. When the response signal receiver circuit 42a is in the protected mode, the operational amplifier 110 is preferably protected from incoming high voltage antenna signals by clamping the third capacitor 112 or by implementing other protection steps within the purview of the skilled artisan.

The present embodiment of the wakeup unit operating method employs the same sequence of functional steps 1-20 described above which are directed by execution of the DSP algorithm. However, additional steps A-D are inserted after step 10 and before step 11 to effect protection of the response signal receiver circuit 42a if necessary as follows:

A) compare analog to digital conversion of analog OP_AMP input signal to a predetermined unsafe threshold level (typically substantially greater than the dynamic response threshold level)
B) if analog to digital conversion of analog OP_AMP input signal is below unsafe threshold level, proceed to step 11;
C) if analog to digital conversion of analog OP_AMP input signal exceeds unsafe threshold level, assert protected mode and periodically repeat steps 4, 7-10, and 3 until analog to digital conversion of analog OP_AMP input signal is below unsafe threshold level;
D) de-assert protected mode and proceed to step 2.

In summary, steps A-D comprise conveying the analog OP_AMP input signal to the wakeup controller 44a where the ADC 48 converts the analog signal to a digital signal. The wakeup controller 44a determines the amplitude of the digital signal and compares the amplitude value to a predetermined unsafe threshold level. The amplitude of the digital signal preferably represents a measure of radio frequency (RF) energy field strength present at the antenna assembly 20a. If the amplitude of the digital signal is less than the predetermined unsafe threshold level, the response signal receiver circuit 42a remains in the unprotected mode by continuing to de-assert the DETCLR output signal and the wakeup unit 26a performs the transponder detection operations taught herein to actively seek a transponder 12 in the surrounding space of the reader 14.

If the amplitude of the digital signal is greater than the predetermined unsafe threshold level, the response signal receiver circuit 42a switches to the protected mode by continuously asserting the DETCLR output signal to the base of the second transistor 108 which clamps one of the inputs (e.g., noninverting input) of the operational amplifier 110. The wakeup controller 44a also preferably sends a signal to the main controller 24 indicating a high RF energy field strength at the antenna assembly 20a. The main controller 24 preferably performs operations to protect sensitive components contained within the ER circuit 22 from incoming high voltage antenna signals in response to the high RF energy field strength signal from the wakeup controller 44a.

Once in the protected mode, the response signal receiver circuit 42a preferably remains in the protected mode for a specified (i.e., predetermined) or unspecified protected time period. Upon expiration of the protected time period, the wakeup controller 44 briefly de-asserts the DETCLR output signal which enables another determination of the amplitude of the digital OP_AMP output signal. If the amplitude of the digital OP_AMP output signal is still above the predetermined unsafe threshold level, the response signal receiver circuit 42a remains in the protected mode. The protected time period can also be adjusted as a function of the newly determined value of the amplitude of the digital OP_AMP output signal. However, if the amplitude of the digital signal is less than the predetermined unsafe threshold level, the wakeup controller 44a reinitiates the detection mode.

While the forgoing preferred embodiments of the invention have been described and shown, it is understood that alternatives and modifications, such as those suggested and others, may be made thereto and fall within the scope of the invention. For example, although the detection signal generator circuit and the response signal receiver circuit are shown and described above as being separate from the ER circuit, it is within the purview of the skilled artisan to partially or entirely incorporate the detection signal generator and receiver circuits into the ER circuit. There is also the possibility of sharing certain specified components between the circuits. It is further within the purview of the skilled artisan to alternately integrate some or all of the functions and/or structure of the detection circuit controller into the main controller or vice versa. Such alternatives and modifications are within the scope and contemplation of the present invention.

Figure 7:
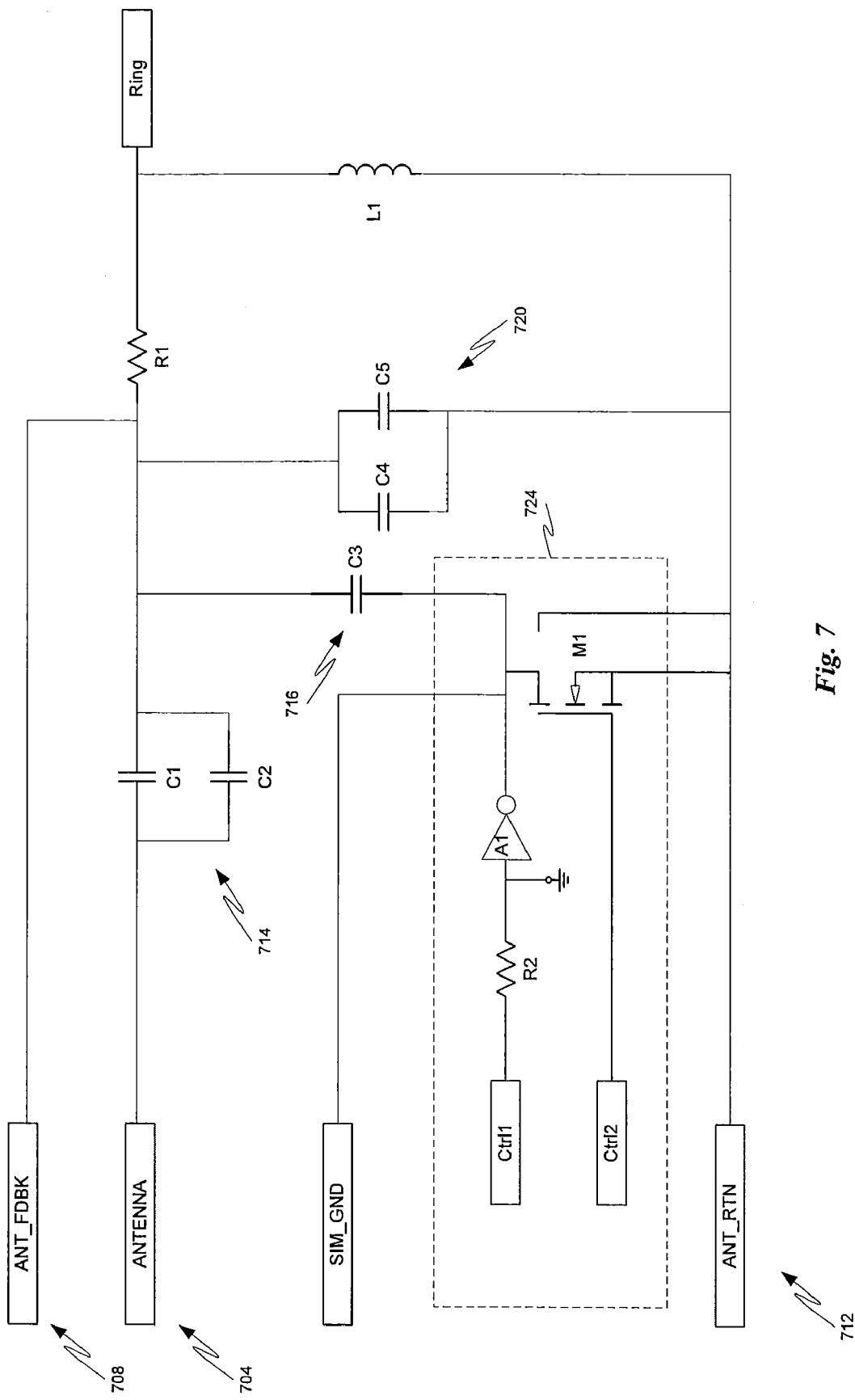
FIG. 7 is a schematic diagram of low power reader ping/read RFID antenna and associated tuning circuitry in accordance with at least some embodiments of the present invention.

Referring now to FIG. 7, a circuit schematic of a reader 14 employing a low power ping/read RFID antenna and associated tuning circuitry will be described in accordance with at least some embodiments of the present invention. In accordance with at least some embodiments of the present invention, the tuning circuitry depicted in FIG. 7 may be coupled to one or both of the ER circuit 22 and wakeup unit 26. More specifically, the outputs of the ER circuit 22 and/or wakeup unit 26 may be provided as inputs at the antenna input 704.

The antenna assembly 20 may be connected to the driver via a 2 thru 4-wire interface or a 2 thru 2-wire interface. There are a number of different wiring configurations that can be employed in a 2 thru 4-wire interface. In accordance with at least some embodiments of the present invention, various 3-wire interface configurations may also be employed between the antenna assembly 20 and the other circuitry of the reader 10. In the embodiment depicted in FIG. 7, the antenna assembly 20 comprises a single antenna L1.

In one particular circuit configuration, a drive, feedback, and ground or drive, simulated ground, and ground 3-wire configuration may be used. In the 2 or 3-wire interface, the antenna L1 could appear to be remoted from the tuning portions of the circuit shown. Other design modifications for the interface between the antenna L1 and the reader will also become apparent to those skilled in the art after reviewing this disclosure.

In accordance with embodiments of the present invention, the antenna L1 may be adapted to execute both ping (e.g., transponder detection) and read (e.g., transponder transaction) through controls instituted by the reader circuitry. The size of the antenna L1 inductance may be selected based on the type of transponders that are to be communicated with as well as other factors including desired range and power consumption. In accordance with at least one embodiment of the present invention, the antenna L1 may comprise an inductance of about 1.25 uH.

The antenna L1 may also be connected to the reader circuitry through a first resistance R1 that controls the amount of current that is flowed through the antenna L1. In accordance with at least one embodiment of the present invention, the first resistance R1 may be about 1.1 ohms thereby limiting the peak Q and circulating currents through the antenna L1 during the transaction mode.

The reader tuning circuit 700 may comprise an antenna input that corresponds to an output of the reader driver circuit (not depicted). The tuning circuit may also comprise one or more ground lines (depicted as ANT_RTN and SIM_GND). Additionally, the tuning circuit 700 may comprise an antenna feedback 708 where the signal that is supplied to the antenna L1 is also provided back to the response signal receiver circuit 42. The antenna feedback 708 may be compared to the antenna return line 712 to determine whether a transponder 12 is within communication range of the reader 10.

In accordance with at least some embodiments of the present invention, the tuning circuit 700 may include a set of series capacitors 714 that comprise one, two, or more capacitors which are connected in series with the input 704 provided by the driver circuit (detection signal generator circuit 40 and/or excitation signal generator circuit 31) to the antenna L1. A first of the series capacitors C1 may include to a relatively large capacitance value (e.g., about 27 pF) whereas a second of the series capacitors C2 may include a relatively small capacitance value (e.g., about 1 pF). As noted above, additional capacitors of various sizes may be connected in parallel to the first and second series capacitors C1, C2 to further refine the series capacitance 714.

In addition to the set of series capacitors 714, the tuning circuit 700 may also comprise two different sets of parallel capacitors 716, 720 that are connected in parallel to the antenna L1. A first set of the parallel capacitors 716 may be connected between control circuitry 724 that is used to initiate pings during a detection mode and the input to the first resistor R1. The first set of parallel capacitors 716 may include one, two, or more capacitors that may be switched on/off to allow the antenna L1 to operate in a detection mode or transaction mode respectively. In one configuration, the first set of parallel capacitors 716 may include a first parallel capacitance C3 that is operated by an inverter A1 that is operable to control the operation of the first parallel capacitance C3. In accordance with at least some embodiments of the present invention, the inverter A1 may cause the first parallel capacitance C3 to be shifted or disconnected from ground thereby causing a voltage pulse to be transmitted to the antenna L1 and a detection pulse or ping to be transmitted via the antenna L1 into the space about the antenna L1. After this detection mode has been initiated (e.g., via generation of the pulse or ping), the inverter A1 may reconnect the first parallel capacitance C3 to ground thereby putting the reader back into transaction mode. The inverter A1 may be operated by a first control signal Ctrl 1 that is connected to the inverter A1 through a second resistance R2. Changes in the first control signal Ctrl 1 may cause the inverter A1 to initiate the detection mode in accordance with control algorithms of the present invention.

The inverter A1 may be supplemented with a Field Effect Transistor (FET) M1 such as a MOSFET (e.g., an N-type MOSFET or a P-type MOSFET). The FET M1 may also include an internal resistance that helps the inverter A1 withstand stronger carrier waves generated via the antenna L1. This is also effective in a stronger ping duration due to stretching the waveform by more Q, thus less energy is consumed per resonant cycle. In accordance with at least one embodiment of the present invention, the inverter may include an internal resistance of about 1.8 ohms that is paralleled with R1 during detection mode.

The supplemental FET M1 is useful in configurations where more power is retained in the antenna L1 to generate a longer or stronger ping signal. When more power is provided to the antenna L1, the inverter A1 may be susceptible to damage or wearing out more quickly but for the supplemental FET M1. The FET M1 may be connected to a second control signal Ctrl 2 to coordinate the operation of the FET M1 and the inverter A1. The supplemental FET M1 also allows the impulse/ping generated during the detection mode to be stretched (e.g., when the FET M1 is in an open position). For example, without use of a FET M1, an impulse/ping for 13.56 MHz may decay in about 1 us, whereas an impulse/ping generated with a tuning circuit comprising the FET M1 may take about twice as long to die (i.e., it may die in about 2 us). By stretching the detection impulse, the ability to detect transponders within operating range of the reader is increased.

While the first set of parallel capacitors 716 is used to allow the antenna to switch between operating in a detection mode and a transaction mode, a second set of parallel capacitors 720 can be used to tune the reader antenna to the transponder antenna in the detection mode and/or transaction mode. More specifically, the values of the second set of parallel capacitors 720 may be selected to cause the reader antenna to operate at substantially the same frequency (e.g., 13.56 MHz, 125 kHz, or any other known operating frequency) as the transponder. In accordance with at least some embodiments of the present invention, the second set of parallel capacitors 720 may include one, two, or more capacitors. In accordance with one embodiment, the second set of parallel capacitors 720 may include a first capacitor C4 which is a fine tuning capacitor (e.g., has a capacitance of about 1 pF) and a second capacitor C5 that is a larger capacitor (e.g., has a capacitance of about 30 pF). As can be appreciated by one skilled in the art, additional capacitors may be added to any set of capacitors (e.g., the set of series capacitors 714, the first set of parallel capacitors 716, and/or the second set of parallel capacitors 720).

As can be appreciated by one skilled in the art, a multi-frequency pinging antenna may be provided. Such an antenna may be in communication with a plurality of FETs and parallel capacitors (e.g., switchable capacitors) positioned in parallel with respect to the antenna L1. Each set of FETs and parallel capacitors may be adapted to cause different size ping signals (in strength and/or duration) to be generated by the antenna L1 possibly at different frequencies. Accordingly, a multi-frequency pinging antenna L1 may be provided that is capable of also reading any transponder 12 that is detected.

A symmetric circuit design may also be utilized in accordance with at least some embodiments of the present invention. More specifically, a symmetric circuit design may be used that effectively replicates the asymmetric circuit design depicted in FIG. 7. An exemplary symmetric circuit design would employ a second antenna connected in series with the first antenna L1 and the set of series capacitors and parallel capacitors may be mirrored across the ground line. The use of a symmetric circuit improves the effective range of the reader by about 40%.

Figure 8:
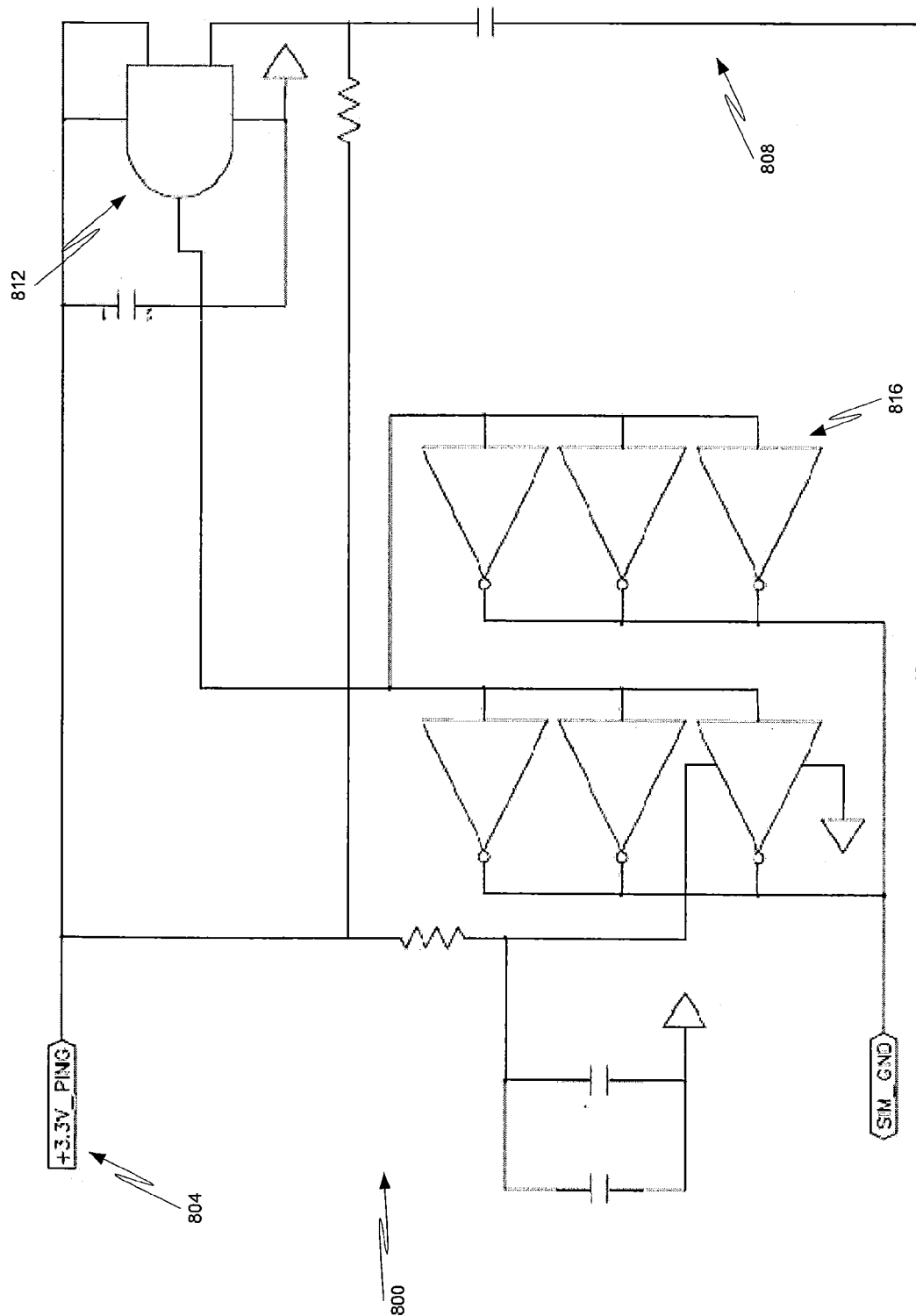
FIG. 8 is a schematic diagram of a drive circuit in accordance with at least some embodiments of the present invention.

Referring now to FIG. 8, details of the inverter A1, which is also referred to herein as the ping and read drive circuit 800 (which may also collectively be referred to as the detection signal generator circuit 40 and response signal receiver circuit 42). The ping and read drive circuit 800 provides, as an output, the impulse signal that switches the first set of parallel capacitors 714 between the on and off state. The ping and read drive circuit may include a continuous voltage input 804 that corresponds to the desired ping output during the detection mode. The continuous voltage input 804 may comprise a low or high impedance value in accordance with at least some embodiments of the present invention. The ping and read drive circuit 800 may also include another input that controls when the continuous voltage input is transmitted by the rest of the driver circuit (e.g., the ER circuit 22). More specifically, the continuous voltage 804 and other controlling input 808 may be provided as inputs to an AND gate 812 where a change in the controlling input 808 causes the continuous voltage 804 to be passed to the rest of the circuit 800 for a brief amount of time. When the controlling input 808 switches back to its original state, the AND gate 812 may disallow the continuous voltage 804 from being provided to the rest of the circuit 800, thereby reducing the overall power consumption of the reader 10.

In accordance with at least some embodiments of the present invention, the output of the AND gate 812 may be provided to a series of NOT gates 816 that are used to condition the output voltage to the rest of the reader circuitry. The series of NOT gates 816 may be connected partially in series and partially in parallel. More specifically, and in accordance with at least some embodiments of the present invention, a set of 6 NOT gates may be provided to control the voltage output received by the AND gate 812 and subsequently provided as an output to the first set of parallel capacitors 716. One exemplary type of NOT gate that may be utilized in accordance with at least some embodiments of the present invention includes a 74AC04 type NOT gate. Alternatively, an LCX04 NOT gate may be utilized instead. As can be appreciated by one skilled in the art, other types of known NOT gates and gate drivers may be utilized while maintaining the spirit of the present invention.

Figure 9:
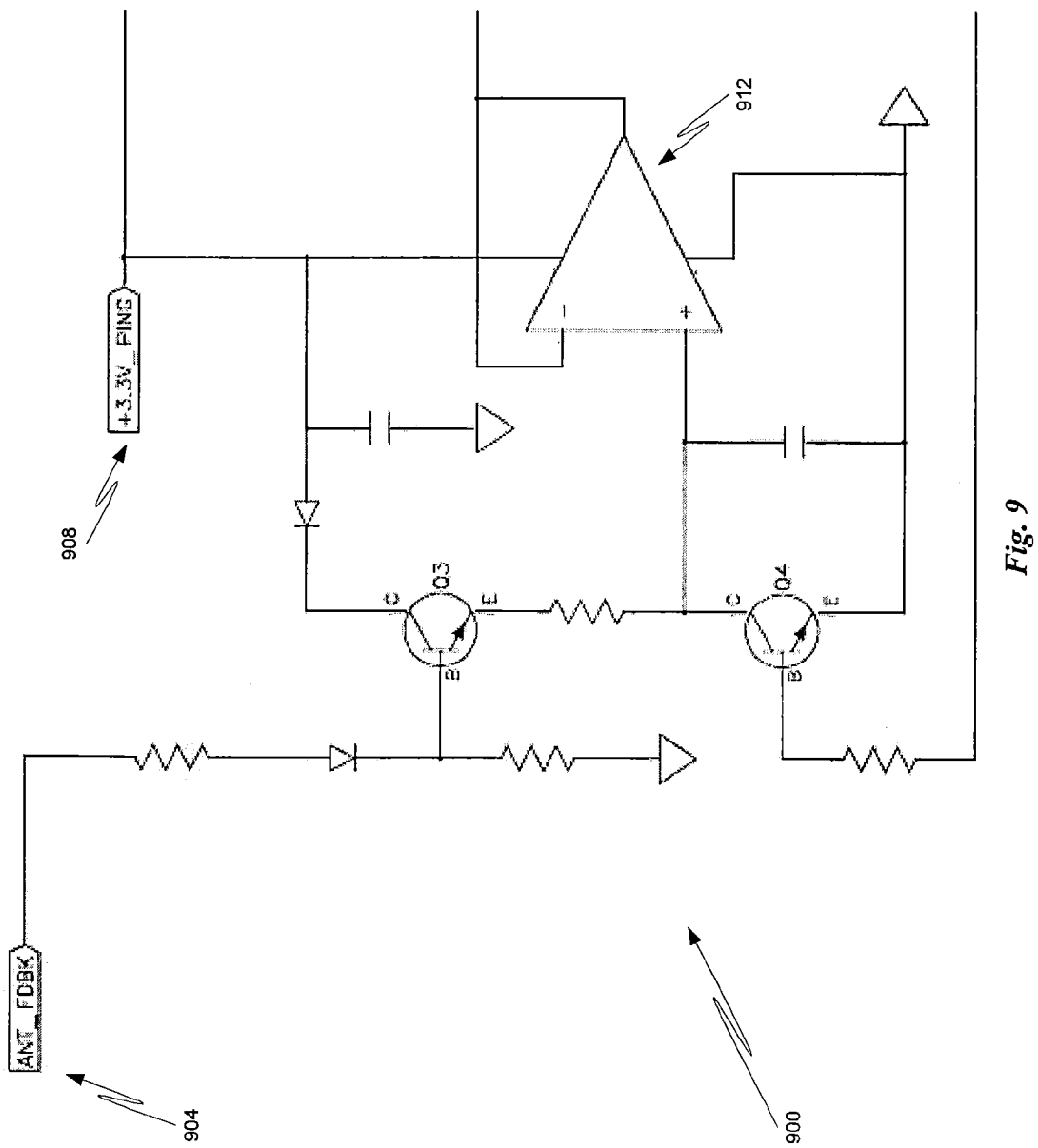
FIG. 9 is a schematic diagram of a receive circuit in accordance with at least some embodiments of the present invention.

With reference now to FIG. 9, one embodiment of the ping receiver circuitry 900 or response signal receiver circuit 42 will be described. The input 904 of the ping receiver circuitry 900 may correspond to the antenna feedback 708 received from the tuning circuit 700. The received input 904 may be passed through a resistor R2 and a first diode D1 that rectifies the received input 904. The input 904 may then be connected to one, two, or more transistors Q1, Q2, such as an NPN transistor or PNP transistor. An output of the transistors Q1, Q2 may be provided to an operational amplifier 908 that buffers the voltage received at the antenna feedback and the actual ping output. This transconductance at the operational amplifier allows a good analog to digital reading to determine a delta value. The delta value between the actual antenna feedback 904 and the actual ping output 908 may then be analyzed to determine whether a threshold has been exceeded which shows that a transponder or other type of RF field perturbing object has been detected in the range of the reader.

Although particular types of circuit elements are depicted in the figures described above, one skilled in the art will appreciate that different types of circuit elements may be utilized in place of or in addition to those depicted while adhering to the basic principles of the present invention. More specifically, the unique circuit design of the present invention may still be carried out using known and not yet developed CMOS IC gates, gate drivers, discrete PFETs and/or NFETs, or MOSFETs in various combinations.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic devices such as CPLDs, gate arrays in FPGAs, a communications device, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software using procedural or process-oriented software development environments that provide portable source code that can be used on a variety of computer or workstation platforms. Alternatively, the disclosed system may be implemented partially or fully in hardware using bipolar or CMOS logic circuits or low power VLSI design techniques. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer or engineering arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, an RFID transponder detector and reader antenna. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A reader for an RFID system comprising:
a reader antenna;
a driver circuit adapted to provide current to the reader antenna; and
a tuning circuit situated between the driver circuit and the reader antenna, the tuning circuit adapted to condition current provided from the driver circuit to the reader antenna, the tuning circuit comprising control circuitry configured to switch the reader between a detection mode and a transaction mode, wherein the reader antenna is used to transmit detection signals in the detection mode and transaction signals in the transaction mode, wherein the tuning circuit comprises a second set of capacitors connected in parallel across the reader antenna, the second set of capacitors adapted to switch a carrier frequency of detection signals generated by the reader antenna between at least two different carrier frequencies.

2. The reader of claim 1, wherein the tuning circuit is coupled to the reader antenna via a 4-wire interface.

3. The reader of claim 1, wherein the tuning circuit is coupled to the reader antenna via a 2-wire interface.

4. The reader of claim 1, wherein the tuning circuit causes an operable range of the reader antenna to be greater in the detection mode than in the transaction mode.

5. The reader of claim 1, wherein a first of the at least two different carrier frequencies is about 125 kHz and wherein a second of the at least two different carrier frequencies is about 13.56 MHz.

6. The reader of claim 1, wherein the tuning circuit is further adapted to tune the reader antenna to operate at either of the at least two different carrier frequencies in the transaction mode.

7. The reader of claim 6, wherein the tuning circuit sets the carrier frequency of the reader antenna according to the carrier frequency at which a transponder was detected in the detection mode.

8. The reader of claim 1, wherein the tuning circuit further comprises a first set of the parallel capacitors connected between control circuitry that is used to initiate pings during the detection mode and the reader antenna, wherein the first set of capacitors is connected in parallel with the second set of capacitors.

9. The reader of claim 8, wherein the first set of parallel capacitors includes at least a first parallel capacitance that is operated by an inverter adapted to control the operation of the at least a first parallel capacitance by causing the at least a first parallel capacitance to be shifted or disconnected from ground thereby causing a voltage pulse to be transmitted to the reader antenna and a detection pulse or ping to be transmitted via the reader antenna into the space about the reader antenna.

10. The reader of claim 9, wherein after the detection mode has been initiated, the inverter reconnects the at least a first parallel capacitance to ground thereby putting the reader back into the transaction mode.

11. The reader of claim 10, wherein the control circuitry further comprises a Field Effect Transistor.

12. The reader of claim 11, wherein the Field Effect Transistor comprises at least one of an N-type MOSFET and a P-type MOSFET, and wherein the Field Effect Transistor further comprises an internal resistance.

13. The reader of claim 11, wherein the inverter comprises at least one AND gate and a plurality of NOT gates which are used to condition the output voltage of the control circuitry to the rest of the tuning circuit.

14. The reader of claim 13, wherein the plurality of NOT gates include six NOT gates, a first set of the NOT gates being connected in series and a second set of the NOT gates also being connected in series, wherein the first and second sets of NOT gates are connected in parallel with each other.

15. A method of operating an RFID reader, the RFID reader comprising an antenna, driver circuitry, and a tuning circuit situated between the antenna and driver circuitry, comprising:
transmitting a detection signal from the antenna, the detection signal being generated by the tuning circuit;
switching the reader from a detection mode to a transaction mode; and
transmitting a transaction signal from the antenna, wherein the detection signal is used to detect the existence of an RFID transponder within communication range of the antenna and wherein the transaction signal is used to share transaction data with the RFID transponder, wherein the tuning circuit comprises a first and second set of capacitors connected in parallel across the reader antenna, the second set of capacitors adapted to switch a carrier frequency of detection signals and transaction signals generated by the reader antenna between at least two different carrier frequencies, the first set of the parallel capacitors connected between control circuitry that is used to initiate pings during the detection mode and the antenna.

16. The method of claim 15, wherein the first set of parallel capacitors includes at least a first parallel capacitance that is operated by an inverter adapted to control the operation of the at least a first parallel capacitance.

17. The method of claim 16, further comprising:
causing the at least a first parallel capacitance to be shifted or disconnected from ground thereby resulting in a voltage pulse being transmitted to the antenna;
receiving the voltage pulse at the antenna;
comparing the voltage pulse with the detection signal transmitted from the antenna to determine a delta value between the voltage pulse and the detection signal;
determining the delta value meets or exceeds a predetermined threshold; and
causing the reader to switch from the detection mode to the transaction mode only when it is determined that the delta value meets or exceed the predetermined threshold.

18. The method of claim 16, wherein the inverter comprises at least one AND gate and a plurality of NOT gates which are used to condition the output voltage of the control circuitry to the rest of the tuning circuit.

19. The method of claim 18, wherein the plurality of NOT gates include six NOT gates, a first set of the NOT gates being connected in series and a second set of the NOT gates also being connected in series, wherein the first and second sets of NOT gates are connected in parallel with each other.

20. An RFID reader, comprising:
an antenna; and
a tuning circuit operable to cause the antenna to transmit detection signals at two or more different carrier frequencies and transaction signals at two or more different carrier frequencies, wherein the detection signals are transmitted by the antenna when the reader is in a detection mode, wherein the transaction signals are transmitted by the antenna when the reader is in a transaction mode, and wherein the tuning circuit limits operation of the reader in the transaction mode to instances where a transponder operating at one of the two or more different carrier frequencies is detected within an operating range of the antenna, wherein the tuning circuit comprises a first and second set of capacitors connected in parallel across the reader antenna, the second set of capacitors adapted to switch a carrier frequency of detection signals and transaction signals generated by the reader antenna between at least two different carrier frequencies, the first set of the parallel capacitors connected between control circuitry that is used to initiate pings during the detection mode and the antenna.

21. The reader of claim 20, wherein a first of the two or more different carrier frequencies is about 125 kHz and wherein a second of the two or more different carrier frequencies is about 13.56 MHz.

22. The reader of claim 20, wherein the first set of parallel capacitors includes at least a first parallel capacitance that is operated by an inverter adapted to control the operation of the at least a first parallel capacitance, wherein the inverter comprises at least one AND gate and a plurality of NOT gates which are used to condition the output voltage of the control circuitry to the rest of the tuning circuit.

* * * * *